US011802236B2

(12) United States Patent
Hahn et al.

(10) Patent No.: US 11,802,236 B2
(45) Date of Patent: *Oct. 31, 2023

(54) COMPOSITIONS AND METHODS FOR PRESSURE PROTECTION

(71) Applicant: CHEVRON U.S.A. INC., San Ramon, CA (US)

(72) Inventors: Ruth Ellen Hahn, Houston, TX (US); Taimur Malik, Houston, TX (US); Samiha Said Elsayed Morsy, Houston, TX (US); Nabijan Nizamidin, Houston, TX (US); Mohsen S. Tagavifar, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/861,987

(22) Filed: Jul. 11, 2022

(65) Prior Publication Data

US 2023/0084576 A1    Mar. 16, 2023

Related U.S. Application Data

(63) Continuation of application No. 16/922,993, filed on Jul. 7, 2020, now Pat. No. 11,384,284.

(Continued)

(51) Int. Cl.
*E21B 43/16* (2006.01)
*C09K 8/94* (2006.01)
(Continued)

(52) U.S. Cl.
CPC ............ *C09K 8/94* (2013.01); *C09K 8/584* (2013.01); *C09K 8/588* (2013.01); *C09K 8/594* (2013.01);
(Continued)

(58) Field of Classification Search
CPC .......... C09K 8/94; C09K 8/584; C09K 8/588; C09K 8/594; C09K 8/665; C09K 8/74;
(Continued)

(56) References Cited

U.S. PATENT DOCUMENTS

| 3,811,504 A | 5/1974 | Haferkamp et al. |
| 3,811,505 A | 5/1974 | Flournoy et al. |

(Continued)

FOREIGN PATENT DOCUMENTS

| WO | 2008/079855 | 7/2008 |
| WO | 2011/094442 | 8/2011 |

(Continued)

OTHER PUBLICATIONS

CSUG/SPE 136757 Vincent, M.C., "Restimulation of Unconventional Reservoirs: When are Refracs Beneficials?" Paper presented at the Canadian Unconventional Resources and International Petroleum Conference, Calgary, Alberta, Canada, Oct. 2010.

(Continued)

*Primary Examiner* — Silvana C Runyan
(74) *Attorney, Agent, or Firm* — Meunier Carlin & Curfman LLC

(57) ABSTRACT

Disclosed are compositions and methods for the pressure protection of existing wells during infill drilling operations.

20 Claims, 2 Drawing Sheets

Related U.S. Application Data

(60) Provisional application No. 62/873,904, filed on Jul. 13, 2019, provisional application No. 62/873,902, filed on Jul. 13, 2019, provisional application No. 62/873,901, filed on Jul. 13, 2019, provisional application No. 62/871,165, filed on Jul. 7, 2019, provisional application No. 62/871,164, filed on Jul. 7, 2019.

(51) Int. Cl.

| | | |
|---|---|---|
| *C09K 8/60* | (2006.01) | |
| *C09K 8/594* | (2006.01) | |
| *C09K 8/588* | (2006.01) | |
| *E21B 33/138* | (2006.01) | |
| *E21B 43/26* | (2006.01) | |
| *C09K 8/584* | (2006.01) | |
| *C09K 8/66* | (2006.01) | |
| *C09K 8/74* | (2006.01) | |
| *E21B 43/267* | (2006.01) | |
| *E21B 43/17* | (2006.01) | |
| *E21B 43/25* | (2006.01) | |

(52) U.S. Cl.
CPC .............. *C09K 8/602* (2013.01); *C09K 8/665* (2013.01); *C09K 8/74* (2013.01); *E21B 33/138* (2013.01); *E21B 43/162* (2013.01); *E21B 43/166* (2013.01); *E21B 43/17* (2013.01); *E21B 43/255* (2013.01); *E21B 43/26* (2013.01); *E21B 43/267* (2013.01); *E21B 2200/20* (2020.05)

(58) Field of Classification Search
CPC ...... E21B 43/166; E21B 43/162; E21B 43/17; E21B 43/255; E21B 43/267; E21B 2200/20; C21B 43/26
See application file for complete search history.

(56) References Cited

U.S. PATENT DOCUMENTS

| | | | |
|---|---|---|---|
| 3,811,507 A | 5/1974 | Flournoy et al. | |
| 3,890,239 A | 6/1975 | Dycus et al. | |
| 4,463,806 A | 8/1984 | Hurd | |
| 5,488,148 A | 1/1996 | Weerasooriya et al. | |
| 6,022,843 A | 2/2000 | Shanks et al. | |
| 6,225,267 B1 | 5/2001 | Eckard et al. | |
| 7,629,299 B2 | 12/2009 | Berger et al. | |
| 7,718,582 B2 | 5/2010 | Le et al. | |
| 7,770,641 B2 | 8/2010 | Dwarakanath et al. | |
| 8,211,837 B2 | 7/2012 | Weerasooriya et al. | |
| 9,422,469 B2 | 8/2016 | Dwarakanath et al. | |
| 9,605,198 B2 | 3/2017 | Shong et al. | |
| 9,617,464 B2 | 4/2017 | Dwarakanath et al. | |
| 9,752,071 B2 | 9/2017 | Dwarakanath et al. | |
| 9,976,072 B2 | 5/2018 | Shong et al. | |
| 10,011,757 B2 | 7/2018 | Dwarakanath et al. | |
| 10,266,750 B2 | 4/2019 | Oghena et al. | |
| 10,337,303 B2 | 7/2019 | Dwarakanath et al. | |
| 11,028,316 B2* | 6/2021 | Aslam .................. | E21B 43/168 |
| 11,286,415 B2* | 3/2022 | Belakshe ................. | C02F 5/12 |
| 2005/0199395 A1 | 9/2005 | Berger et al. | |
| 2006/0185845 A1 | 8/2006 | Shpakoff et al. | |
| 2006/0189486 A1 | 8/2006 | Shpakoff et al. | |
| 2007/0191633 A1 | 8/2007 | Berger et al. | |
| 2008/0164021 A1 | 7/2008 | Dykstar | |
| 2009/0112014 A1 | 4/2009 | Campbell et al. | |
| 2009/0270281 A1 | 10/2009 | Steinbrenner et al. | |
| 2010/0004843 A1 | 1/2010 | Yu et al. | |
| 2010/0292110 A1 | 11/2010 | Pope et al. | |
| 2010/0319920 A1 | 12/2010 | Pope et al. | |
| 2011/0046024 A1 | 2/2011 | Campbell et al. | |
| 2011/0048721 A1 | 3/2011 | Pope et al. | |
| 2011/0059872 A1 | 3/2011 | Weerasooriya et al. | |
| 2011/0059873 A1 | 3/2011 | Weerasooriya et al. | |
| 2011/0071057 A1 | 3/2011 | Weerasooriya et al. | |
| 2011/0100402 A1 | 5/2011 | Soane et al. | |
| 2011/0190174 A1 | 8/2011 | Weerasooriya et al. | |
| 2011/0190175 A1 | 8/2011 | Steinbrenner et al. | |
| 2011/0201531 A1 | 8/2011 | Sharma et al. | |
| 2013/0277050 A1 | 10/2013 | Cherian et al. | |
| 2014/0096967 A1 | 4/2014 | Sharma et al. | |
| 2014/0288909 A1 | 9/2014 | Prestwood et al. | |
| 2016/0280983 A1 | 9/2016 | Zamora et al. | |
| 2016/0281494 A1 | 9/2016 | Shirdel et al. | |
| 2017/0198202 A1 | 7/2017 | Shong et al. | |
| 2017/0240804 A1* | 8/2017 | Tellez ...................... | C09K 8/38 |
| 2019/0040304 A1* | 2/2019 | Holtsclaw ............... | C09K 8/62 |
| 2019/0264552 A1 | 8/2019 | Martysevich et al. | |
| 2020/0024937 A1 | 1/2020 | Parkhonyuk et al. | |
| 2021/0002990 A1 | 1/2021 | Morsy et al. | |
| 2021/0002991 A1 | 1/2021 | Morsy et al. | |

FOREIGN PATENT DOCUMENTS

| | | |
|---|---|---|
| WO | 2012/027757 | 3/2012 |
| WO | 2019028083 | 2/2019 |
| WO | 2019028085 | 2/2019 |
| WO | 2019028086 | 2/2019 |

OTHER PUBLICATIONS

SPE 184851, Bommer, Peter, et al., "Re-Designing from Scratch and Defending Offset Wells: Case Study of a Six-Well Bakken Zipper Project, McKenzie County, ND." SPE Hydraulic Fracturing Technology Conference and Exhibition. Society of Petroleum Engineers, 2017.

SPE-189860, Bommer, Peter A., and Marcus A. Bayne., "Active Well Defense in the Bakken: Case Study of a Ten-Well Frac Defense Project, McKenzie County, ND." SPE Hydraulic Fracturing Technology Conference and Exhibition. Society of Petroleum Engineers, 2018.

SPE-191712-MS. Whitfield, Tom, M. Hunter Watkins, and L. James Dickinson. "Pre-loads: successful mitigation of damaging frac hits in the Eagle Ford." SPE Annual Technical Conference and Exhibition. OnePetro, 2018. SPE-191712-MS.

URTeC: 2902707, Nieto, et al., "An Integrated Approach to Optimizing Completions and Protecting Parent Wells in the Montney Formation, N.E.B.C", 2018, This paper was prepared for presentation at the Unconventional Resources Technology Conference held in Houston, Texas, USA, Jul. 23-25, 2018. Unconventional Resources Technology Conference (URTeC) DOI 10.15530/urtec-2018-2902707.

URTeC: 2881265, Gala, et al., "Modeling of Fluid Injection in Depleted Parent Wells to Minimize Damage due to Frac-Hits", This paper was prepared for presentation at the Unconventional Resources Technology Conference held in Houston, Texas, USA, Jul. 23-25, 2018.

SPE-1117-0035, Jacobs, Trent. "Frac hits reveal well spacing may be too tight, completion volume too large." Journal of Petroleum Technology 69.11 (2017): 35-38.

SPE-1218-0034, Jacobs, Trent. "Fighting Water With Water: How Engineers are Turning the Tides on Frac Hits." Journal of Petroleum Technology 70.12 (2018): 34-38.

URTeC: 2662893 Sun, Hao, et al. "Understanding the'Frac-Hits' Impact on a Midland Basin Tight-Oil Well Production." SPE/AAPG/SEG Unconventional Resources Technology Conference. Unconventional Resources Technology Conference, 2017.

URTeC: 2690466 Ajisafe, Foluke, et al. "Understanding Impact of Well Spacing and Interference on Production Performance in Unconventional Reservoirs, Permian Basin." Unconventional Resources Technology Conference, Austin, Texas, Jul. 24-26, 2017. Society of Exploration Geophysicists, American Association of Petroleum Geologists, Society of Petroleum Engineers, 2017.

URTeC: 2691962, Cao, Richard, et al. "Well interference and optimum well spacing for Wolfcamp development at Permian Basin." Unconventional Resources Technology Conference, Austin,

(56) References Cited

OTHER PUBLICATIONS

Texas, Jul. 24-26, 2017. Society of Exploration Geophysicists, American Association of Petroleum.
URTeC: 2695433 Rafiee, Mehdi, and Tarun Grover. "Well spacing optimization in Eagle Ford shale: an operator's experience." Unconventional Resources Technology Conference, Austin, Texas, Jul. 24-26, 2017. Society of Exploration Geophysicists, American Association of Petroleum Geologists, Society of Petroleum Engineers, 2017.
Zhang, Jincai, and Shang-Xian Yin. "Fracture gradient prediction: an overview and an improved method." Petroleum Science 14.4 (2017): 720-730.
Minifrac Tests, 2012, http://www.fekete.com/SAN/TheoryAndEquations/WellTestTheoryEquations/Minifrac.htm).
SPE 129766, Barnes, Julian Richard, et al. "Application of internal olefin sulfonates and other surfactants to EOR. Part 1: Structure-Performance relationships for selection at different reservoir conditions." SPE improved oil recovery symposium. Society of Petroleum Engineers, 2010.
URTeC: 2902400 Swanson, Cory, et al. "Post-Frac-Hit Mitigation and Well Remediation of Woodford Horizontal Wells With Solvent/Surfactant Chemistry Blend." Unconventional Resources Technology Conference, Houston, Texas, Jul. 23-25, 2018. Society of Exploration Geophysicists, American Association of Petroleum Geologists, Society of Petroleum Engineers, 2018.
SPE-197097-MS, Xu, Liang, James Ogle, and Todd Collier. "Fracture Hit Mitigation Through Surfactant-Based Treatment Fluids in Parent Wells." SPE Liquids-Rich Basins Conference-North America. Society of Petroleum Engineers, 2019, 8 pages.
Morsy, Samiha. "Experimental and simulation study of improved oil recovery in shale formations." Texas Tech University, May 2014.

\* cited by examiner

Chevron Simulation Results

Water pre-load improves the child well fracture propagation towards the virgin rock that results in additional EUR.

| Co-Development Case | Depletion Case | Water Pre-load Case |
|---|---|---|
| 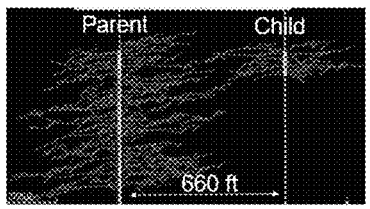 | 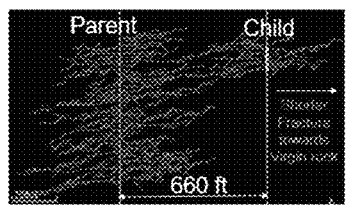 | 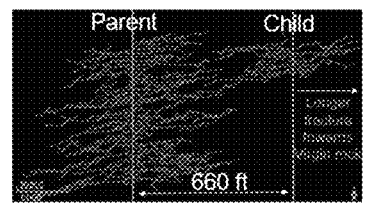 |
| The parent and child wells are fractured at the same time | The child well is fractured after one year of the parent well | The child well is fractured after one year of the parent well and water pre-load |
| 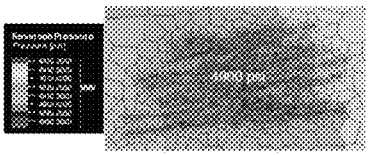 | 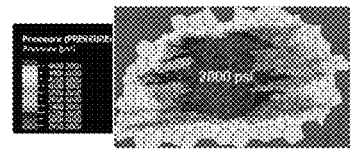 | 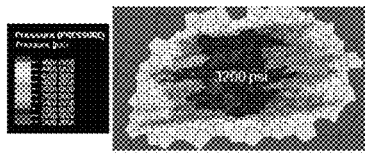 |
| Parent well Pressure | Parent well Pressure | Parent well Pressure |

FIGURE 1A

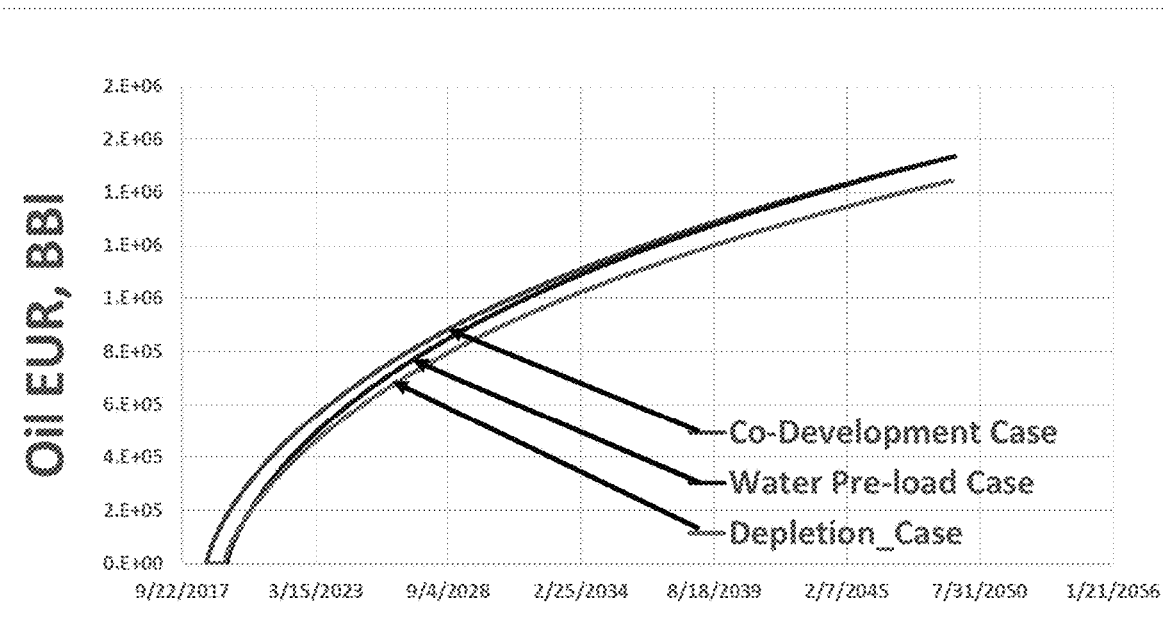

FIGURE 1B

COMPOSITIONS AND METHODS FOR PRESSURE PROTECTION

CROSS-REFERENCE TO RELATED APPLICATIONS

This application is a continuation of U.S. application Ser. No. 16/922,993, filed Jul. 7, 2020, which claims the benefit of priority to 62/871,164 filed Jul. 7, 2019, 62/873,901 filed Jul. 13, 2019, 62/871,165 filed Jul. 7, 2019, 62/873,904 filed Jul. 13, 2019, and 62/873,902 filed Jul. 13, 2019, and each of these disclosures is incorporated by reference herein in its entirety.

BACKGROUND

During hydraulic fracturing operations in shale and tight rock reservoirs, new wells drilled adjacent (e.g., within 5000 ft) to existing or parent wells can produce sub-optimal results due to well-to-well interference. For example, the fracture network for the new (child) well can be skewed towards the existing (parent or teenage) well, resulting in a negative production impact to the child well. There can also be a premature decline in production in the existing well where the fracturing treatment in the new well pushes fluids and debris (e.g., sand, shale fragments) into the existing well, potentially causing damage to the completion or lift equipment of the existing well and/or requiring the existing well to be shut-in or cleaned out. This loss of production and poor fracture alignment is well documented in literature and industry.

SUMMARY

During infill drilling, water can be pumped into the existing wells to increase wellbore pressure. This injection can help the child well fracture network be less skewed and limit the amount of fluid/debris introduced into the existing well(s) during the fracturing operation on the child well. This approach can be referred to as frac protect, active well defense, pre-loading, loading, or recharging.

Herein, methods which employ aqueous pressure protection compositions are described. The aqueous pressure protection compositions can include one or more components which can improve hydrocarbon recovery from the existing wellbore (e.g., following pressure protection/pre-loading with the aqueous pressure protection composition). Examples of such components include a surfactant package, an acid (e.g., to improve permeability in proximity to the wellbore and/or to remove any mineral precipitates in proximity to the wellbore), an alkali agent (e.g., to reduce surfactant adsorption and/or to generate surfactant in situ from active oils present in the formation), a co-solvent, a viscosity-modifying polymer, or any combination thereof. Additional additives can also be incorporated in the aqueous pressure protection compositions, such as a chelating agent (e.g., EDTA or a salt thereof, to reduce formation damage), a clay swelling inhibitor (e.g., KCl, to improve injection efficiency), a biocide, a scale inhibitor, an anti-foam agent (e.g., chemical defoamer), a corrosion inhibitor, or any combination thereof.

Provided are methods for the pressure protection of wells (e.g., by pre-loading the wells) using the aqueous pressure protection compositions described herein. Methods for the pressure protection of an existing wellbore that has previously been fractured in proximity to a new wellbore to be fractured can comprise (a) injecting an aqueous pressure protection composition into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. The aqueous pressure protection solution can be injected at a pressure and flowrate effective to increase the existing wellbore pressure without substantially refracturing the existing wellbore.

Also provided are methods for pressure protection of a first wellbore in proximity to a second wellbore. These methods can comprise injecting an aqueous pressure protection composition into the first wellbore in fluid communication with an unconventional subterranean formation prior to and/or during fracturing of the second wellbore in fluid communication with the unconventional subterranean formation. The first wellbore can have an existing reservoir pressure that is less than original reservoir pressure. The aqueous pressure protection solution can be injected at a pressure and flowrate effective to increase the first wellbore pressure without fracturing the first wellbore. The aqueous pressure protection solution can include a surfactant package including a first surfactant. A region of the unconventional subterranean formation in fluid communication with the first wellbore can be naturally fractured, can have been previously fractured one or more times (e.g., fractured, or fractured and refractured one or more times), or any combination thereof. The fracturing of the second wellbore can comprise fracturing or refracturing of a region of the unconventional subterranean formation in fluid communication with the second wellbore.

Also provided are analogous pressure protection methods which employ foamed pressure protection compositions. For example, in some embodiments, a foam can be injected into the existing wellbore to provide pressure protection to the existing wellbore prior to fracturing a new wellbore proximate to the existing wellbore. The foam can comprise any suitable foam known for use in oil and gas operations. The foam can be formed using any suitable expansion gas as discussed in detail below, such as, for example, air, helium, carbon dioxide, nitrogen, natural gas or a hydrocarbon component thereof, or any combination thereof.

Accordingly, also provided are methods for pressure protection of an existing wellbore that has previously been fractured in proximity to a new wellbore to be fractured that comprise (a) injecting a foamed pressure protection composition into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the foamed pressure protection solution can be injected at a pressure and flowrate effective to increase the existing wellbore pressure without substantially refracturing the existing wellbore.

Also provided are analogous pressure protection methods which employ non-aqueous pressure protection compositions. For example, in some embodiments, a gas can be injected into the existing wellbore to provide pressure protection to the existing wellbore prior to fracturing a new wellbore proximate to the existing wellbore. The gas can comprise any suitable gas, such as, for example, air, helium, carbon dioxide, nitrogen, natural gas or a hydrocarbon component thereof, or any combination thereof.

Example methods can comprise (a) injecting a gas into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the gas can be injected at a pressure and flowrate effective to increase the existing wellbore pressure without substantially refracturing the existing wellbore.

Other methods can employ suitable hydrocarbon-based pressure protection composition. For example, pressure protection compositions comprising a hydrocarbon solvent (e.g., liquid petroleum gas (LPG)) can be injected into the existing wellbore to provide pressure protection to the existing wellbore prior to and/or during fracturing a new wellbore proximate to the existing wellbore.

These hydrocarbon-based pressure protection compositions can comprise any of the components described above with respect to aqueous pressure protection compositions. For example, hydrocarbon-based pressure protection compositions can comprise a surfactant package, an acid, an alkali agent, a co-solvent, a viscosity-modifying polymer, or any combination thereof.

Example methods can comprise (a) injecting a pressure protection composition comprising a hydrocarbon solvent into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the pressure protection composition can be injected at a pressure and flowrate effective to increase the existing wellbore pressure without substantially refracturing the existing wellbore.

DESCRIPTION OF DRAWINGS

FIG. 1A shows the results of simulations showing the beneficial effect of pre-loading an existing (parent) well with an aqueous composition prior to fracturing of the new (child) well. As shown in the simulation, water pre-load improves new (child) well fracture propagation towards virgin rock as opposed to towards the previously fractured rock matrix in proximity to the existing well.

FIG. 1B is a plot illustrating the projected improvement in oil recovery as a result of pre-loading with an aqueous pressure protection composition. Pre-loading results in a 6% EUR uplift in child well production as a consequence of pre-loading in this simulation example.

DETAILED DESCRIPTION

Figure 2:
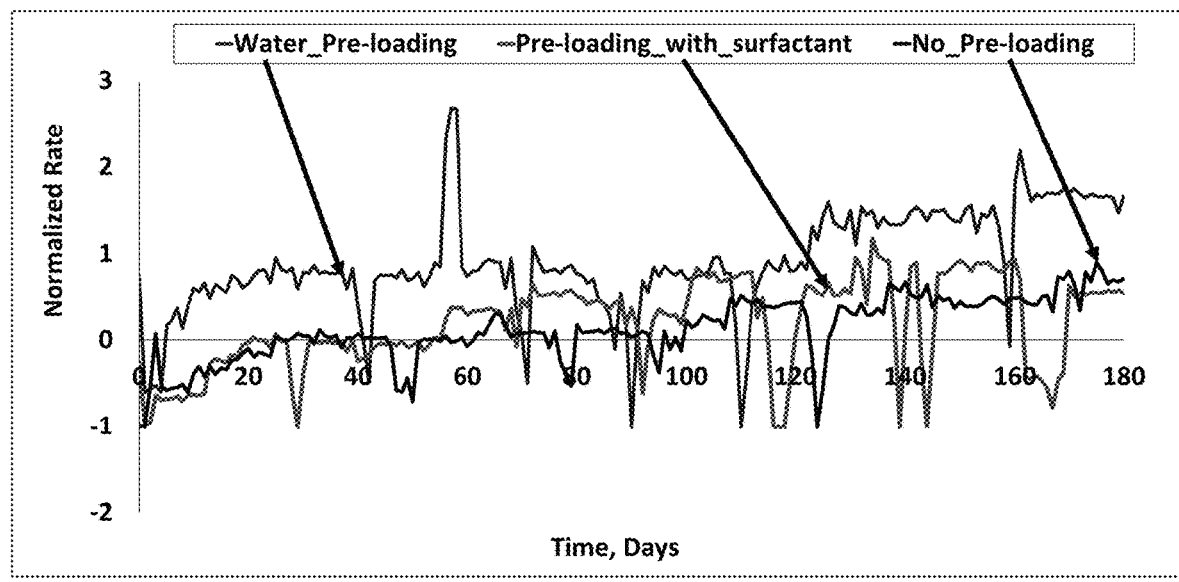
FIG. 2 is a plot illustrating the results of pilot 1. The plot illustrates the normalized rate of hydrocarbon production post frac versus post frac time for wells treated with surfactant pre-loading, water pre-loading as well as wells with no pre-loading.

As used in this specification and the following claims, the terms "comprise" (as well as forms, derivatives, or variations thereof, such as "comprising" and "comprises") and "include" (as well as forms, derivatives, or variations thereof, such as "including" and "includes") are inclusive (i.e., open-ended) and do not exclude additional elements or steps. For example, the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof. Accordingly, these terms are intended to not only cover the recited element(s) or step(s), but may also include other elements or steps not expressly recited. Furthermore, as used herein, the use of the terms "a" or "an" when used in conjunction with an element may mean "one," but it is also consistent with the meaning of "one or more," "at least one," and "one or more than one." Therefore, an element preceded by "a" or "an" does not, without more constraints, preclude the existence of additional identical elements.

The use of the term "about" applies to all numeric values, whether or not explicitly indicated. This term generally refers to a range of numbers that one of ordinary skill in the art would consider as a reasonable amount of deviation to the recited numeric values (i.e., having the equivalent function or result). For example, this term can be construed as including a deviation of ±10 percent of the given numeric value provided such a deviation does not alter the end function or result of the value. Therefore, a value of about 1% can be construed to be a range from 0.9% to 1.1%. Furthermore, a range may be construed to include the start and the end of the range. For example, a range of 10% to 20% (i.e., range of 10%-20%) can includes 10% and also includes 20%, and includes percentages in between 10% and 20%, unless explicitly stated otherwise herein.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

"Hydrocarbon-bearing formation" or simply "formation" refers to the rock matrix in which a wellbore may be drilled. For example, a formation_refers to a body of rock that is sufficiently distinctive and continuous such that it can be mapped. It should be appreciated that while the term "formation" generally refers to geologic formations of interest, that the term "formation," as used herein, may, in some instances, include any geologic points or volumes of interest (such as a survey area).

"Unconventional formation" is a subterranean hydrocarbon-bearing formation that generally requires intervention in order to recover hydrocarbons from the reservoir at economic flow rates or volumes. For example, an unconventional formation includes reservoirs having an unconventional microstructure in which fractures are used to recover hydrocarbons from the reservoir at sufficient flow rates or volumes (e.g., an unconventional reservoir generally needs to be fractured under pressure or have naturally occurring fractures in order to recover hydrocarbons from the reservoir at sufficient flow rates or volumes).

In some embodiments, the unconventional formation can include a reservoir having a permeability of less than 25 millidarcy (mD) (e.g., 20 mD or less, 15 mD or less, 10 mD or less, 5 mD or less, 1 mD or less, 0.5 mD or less, 0.1 mD or less, 0.05 mD or less, 0.01 mD or less, 0.005 mD or less, 0.001 mD or less, 0.0005 mD or less, 0.0001 mD or less, 0.00005 mD or less, 0.00001 mD or less, 0.000005 mD or less, 0.000001 mD or less, or less). In some embodiments, the unconventional formation can include a reservoir having a permeability of at least 0.000001 mD (e.g., at least 0.000005 mD, at least 0.00001 mD, 0.00005 mD, at least 0.0001 mD, 0.0005 mD, 0.001 mD, at least 0.005 mD, at least 0.01 mD, at least 0.05 mD, at least 0.1 mD, at least 0.5 mD, at least 1 mD, at least 5 mD, at least 10 mD, at least 15 mD, or at least 20 mD).

The unconventional formation can include a reservoir having a permeability ranging from any of the minimum values described above to any of the maximum values described above. For example, in some embodiments, the unconventional formation can include a reservoir having a permeability of from 0.000001 mD to 25 mD (e.g., from 0.001 mD to 25 mD, from 0.001 mD to 10 mD, from 0.01 mD to 10 mD, from 0.1 mD to 10 mD, from 0.001 mD to 5 mD, from 0.01 mD to 5 mD, or from 0.1 mD to 5 mD).

The formation may include faults, fractures (e.g., naturally occurring fractures, fractures created through hydraulic fracturing, etc.), geobodies, overburdens, underburdens, horizons, salts, salt welds, etc. The formation may be onshore, offshore (e.g., shallow water, deep water, etc.), etc. Furthermore, the formation may include hydrocarbons, such as liquid hydrocarbons (also known as oil or petroleum), gas hydrocarbons, a combination of hydrocarbons (e.g., a combination of liquid hydrocarbons and gas hydrocarbons (e.g. including gas condensate)), etc.

The formation, the hydrocarbons, or both may also include non-hydrocarbon items, such as pore space, connate water, brine, fluids from enhanced oil recovery, etc. The formation may also be divided up into one or more hydrocarbon zones, and hydrocarbons can be produced from each desired hydrocarbon zone.

The term formation may be used synonymously with the term reservoir or "subsurface reservoir" or "subsurface region of interest" or "subsurface formation" or "subsurface volume of interest". In some embodiments, the reservoir may be, but is not limited to, a shale reservoir, etc. Indeed, the terms "formation," "reservoir," "hydrocarbon," and the like are not limited to any description or configuration described herein.

"Wellbore" refers to a continuous hole for use in hydrocarbon recovery, including any openhole or uncased portion of the wellbore. For example, a wellbore may be a cylindrical hole drilled into the formation such that the wellbore is surrounded by the formation, including rocks, sands, sediments, etc. A wellbore may be used for injection. A wellbore may be used for production. A wellbore may be used for hydraulic fracturing of the formation. A wellbore even may be used for multiple purposes, such as injection and production. The wellbore may have vertical, inclined, horizontal, or a combination of trajectories. For example, the wellbore may be a vertical wellbore, a horizontal wellbore, a multilateral wellbore, an inclined wellbore, a slanted wellbore, etc. The deviation of the wellbore may change, for example, the deviation is changing when the wellbore is curving. The wellbore may include a plurality of components, such as, but not limited to, a casing, a liner, a tubing string, a heating element, a sensor, a packer, a screen, a gravel pack, etc. The wellbore may also include equipment to control fluid flow into the wellbore, control fluid flow out of the wellbore, or any combination thereof. For example, each wellbore may include a wellhead, a BOP, chokes, valves, or other control devices. These control devices may be located on the surface, under the surface (e.g., downhole in the wellbore), or any combination thereof. The wellbore may also include at least one artificial lift device, such as, but not limited to, an electrical submersible pump (ESP) or gas lift. The wellbore may be drilled into the formation using practically any drilling technique and equipment known in the art, such as geosteering, directional drilling, etc. The term wellbore is not limited to any description or configuration described herein. The term wellbore may be used synonymously with the terms borehole or well.

"Fracturing" is one way that hydrocarbons may be recovered (sometimes referred to as produced) from the formation. For example, hydraulic fracturing may entail preparing a fracturing fluid and injecting that fracturing fluid into the wellbore at a sufficient rate and pressure to open existing fractures and/or create fractures in the formation. The fractures permit hydrocarbons to flow more freely into the wellbore. In the hydraulic fracturing process, the fracturing fluid may be prepared on-site to include at least proppants. The proppants, such as sand or other particles, are meant to hold the fractures open so that hydrocarbons can more easily flow to the wellbore. The fracturing fluid and the proppants may be blended together using at least one blender. The fracturing fluid may also include other components in addition to the proppants.

The wellbore and the formation proximate to the wellbore are in fluid communication (e.g., via perforations), and the fracturing fluid with the proppants is injected into the wellbore through a wellhead of the wellbore using at least one pump (oftentimes called a fracturing pump). The fracturing fluid with the proppants is injected at a sufficient rate and pressure to open existing fractures and/or create fractures in the subsurface volume of interest. As fractures become sufficiently wide to allow proppants to flow into those fractures, proppants in the fracturing fluid are deposited in those fractures during injection of the fracturing fluid. After the hydraulic fracturing process is completed, the fracturing fluid is removed by flowing or pumping it back out of the wellbore so that the fracturing fluid does not block the flow of hydrocarbons to the wellbore. The hydrocarbons will typically enter the same wellbore from the formation and go up to the surface for further processing.

The equipment to be used in preparing and injecting the fracturing fluid may be dependent on the components of the fracturing fluid, the proppants, the wellbore, the formation, etc. However, for simplicity, the term "fracturing apparatus" is meant to represent any tank(s), mixer(s), blender(s), pump(s), manifold(s), line(s), valve(s), fluid(s), fracturing fluid component(s), proppants, and other equipment and non-equipment items related to preparing the fracturing fluid and injecting the fracturing fluid.

Other hydrocarbon recovery processes may also be utilized to recover the hydrocarbons. Furthermore, those of ordinary skill in the art will appreciate that one hydrocarbon recovery process may also be used in combination with at least one other recovery process or subsequent to at least one other recovery process.

"Friction reducer," as used herein, refers to a chemical additive that alters fluid rheological properties to reduce friction created within the fluid as it flows through small-diameter tubulars or similar restrictions (e.g., valves, pumps). Generally polymers, or similar friction reducing agents, add viscosity to the fluid, which reduces the turbulence induced as the fluid flows. Reductions in fluid friction of greater than 50% (e.g., from 50% to 250% or from 50% to 100%) are possible depending on the friction reducer utilized, which allows the injection fluid to be injected into a wellbore at a much higher injection rate (e.g., between 60 to 100 barrels per minute) and also lower pumping pressure during proppant injection.

"Injection fluid," as used herein, refers to any fluid which is injected into a reservoir via a well. "Fracturing fluid," as used herein, refers to an injection fluid that is injected into the well under pressure in order to cause fracturing within a portion of the reservoir.

The term "interfacial tension" or "IFT" as used herein refers to the surface tension between test oil and water of different salinities containing a surfactant formulation at different concentrations. Typically, interfacial tensions are measured using a spinning drop tensiometer or calculated from phase behavior experiments.

The term "proximate" is defined as "near". If item A is proximate to item B, then item A is near item B. For example, in some embodiments, item A may be in contact with item B. For example, in some embodiments, there may be at least one barrier between item A and item B such that item A and item B are near each other, but not in contact with each other. The barrier may be a fluid barrier, a non-fluid barrier (e.g., a structural barrier), or any combination thereof. Both scenarios are contemplated within the meaning of the term "proximate."

Unless defined otherwise, all technical and scientific terms used herein have the same meanings as commonly understood by one of skill in the art to which the disclosed invention belongs. Unless otherwise specified, all percentages are in weight percent and the pressure is in atmospheres. All citations referred to herein are expressly incorporated by reference.

Methods

Provided are methods for the pressure protection of wells (e.g., by pre-loading the wells) using the aqueous pressure protection compositions described herein.

Methods for the pressure protection of an existing wellbore that has previously been fractured in proximity to a new wellbore to be fractured can comprise (a) injecting an aqueous pressure protection composition into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore.

The rock matrix of the unconventional subterranean formation in proximity to the existing wellbore can be fractured. For example, in some embodiments, the rock matrix of the unconventional subterranean formation in proximity to the existing wellbore can have been previously fractured (e.g., by injection of a fracturing fluid). In other embodiments, the rock matrix of the unconventional subterranean formation in proximity to the existing wellbore has not been previously fractured, but the rock matrix of the unconventional subterranean formation is naturally fractured. In other embodiments, the rock matrix of the unconventional subterranean formation is naturally fractured and the rock matrix of the unconventional subterranean formation in proximity to the existing wellbore has been previously fractured (e.g., by injection of a fracturing fluid).

The aqueous pressure protection solution can be injected at a pressure and flowrate effective to increase the existing wellbore pressure, stress, or any combination thereof without substantially refracturing the existing wellbore. The volume of aqueous pressure protection solution injected can be selected to increase the existing wellbore pressure and stress without substantially refracturing the existing wellbore.

As is known in the art, the pressure profile can be monitored during injection of the aqueous pressure protection solution into the existing wellbore. During injection without substantially refracturing the existing wellbore, the pressure will generally increase as the aqueous pressure protection solution is injected into the existing wellbore. When the injection pressure begins to plateau, this indicates substantial refracturing of the existing wellbore is occurring. The phrase "substantially refracturing the existing wellbore," as used herein, refers to circumstances where no fracturing is observed (in the form of plateauing) when monitoring injection pressure during injection of the aqueous pressure protection composition.

In some embodiments, there is no need to drill the existing wellbore and the new wellbore. In some embodiments, the existing wellbore has been drilled, the existing wellbore has been completed, and hydrocarbon production has occurred from the existing wellbore. In some embodiments, the new wellbore has been drilled. Furthermore, in some embodiments, the new wellbore may not be completed and the region proximate to the new wellbore has not been previously fractured by hydraulic fracturing. In other embodiments, methods can optionally include one or more of drilling the existing wellbore, completing the existing wellbore, producing hydrocarbons from the existing wellbore (prior to injection of the aqueous pressure protection composition), or drilling the new wellbore in proximity to the existing wellbore.

Further, while embodiments are generally discussed herein referencing a single existing wellbore and a single new wellbore, one of ordinary skill in the art will understand that the methods described herein apply to circumstances which include a plurality of existing wellbores proximate to a single new wellbore, a plurality of new wellbores proximate to a single existing wellbore, or a plurality of existing wellbores proximate to a plurality of new wellbores.

In some embodiments, the existing wellbore was under production prior to injection of the aqueous pressure protection composition. For example, in some embodiments, the existing wellbore was under production for at least three months (e.g., at least six months, at least one year, at least two years, at least three years, at least four years, at least five years, at least ten years, at least twenty years, or more) prior to injection of the aqueous pressure protection composition. In certain embodiments, the existing wellbore was under production for from three months to twenty years (e.g., from one year to ten years, or from one year to five years) prior to injection of the aqueous pressure protection composition.

In some embodiments, at least 10,000 barrels of hydrocarbon (e.g., at least 20,000 barrels of hydrocarbon, at least 30,000 barrels of hydrocarbon, at least 40,000 barrels of hydrocarbon, at least 50,000 barrels of hydrocarbon, at least 100,000 barrels of hydrocarbon, at least 200,000 barrels of hydrocarbon, at least 300,000 barrels of hydrocarbon, at least 400,000 barrels of hydrocarbon, at least 500,000 barrels of hydrocarbon, or more) were produced from the existing wellbore prior to injection of the aqueous pressure protection composition. In some embodiments, from 10,000 barrels of hydrocarbon to 500,000 barrels of hydrocarbon were produced from the existing wellbore prior to injection of the aqueous pressure protection composition.

In some examples, the existing wellbore can have a pressure that is from 5% to 70% of the original reservoir pressure. The original reservoir pressure and the existing wellbore pressure can be measured using standard methods known in the art. The original reservoir pressure can be measured during and/or after of drilling of the existing wellbore (prior to any hydrocarbon production) using, for example, downhole gauges, fiber optics equipment, or other logging equipment. Should no equipment be available, the surface pressure can be used along with the density/height of the fluid column to estimate the original reservoir pressure using the equation: P(surface pressure)+pgh=P(bottomhole pressure). Likewise, the existing wellbore pressure can be measured immediately prior to injection of the aqueous pressure protection composition using, for example, downhole gauges, fiber optics equipment, or other logging equipment. Should no equipment be available, the surface pressure can be used along with the density/height of the fluid column to estimate the original reservoir pressure using the equation:

$$P(\text{surface pressure})+pgh=P(\text{bottomhole pressure}).$$

Step (a) can comprise injecting the aqueous pressure protection composition at a pressure and flowrate effective to increase the existing wellbore pressure by at least 5% (e.g., at least 10% at least 20%, at least 30%, at least 40%, at least 50%, at least 60%, at least 70%, at least 80%, at least 90%, at least 100%, at least 110%, at least 120%, at least 130%, at least 140%, at least 150%, at least 160%, at least 170%, at least 180%, at least 190%, at least 200%, at least 250%, at least 300%, at least 400%, or at least 500%). In some embodiments, step (a) can comprise injecting the aqueous pressure protection composition at a pressure and flowrate effective to increase the existing wellbore pressure by from 5% to 500% (e.g., from 50% to 500%, or from 100% to 500%).

Step (a) can comprise injecting a volume of the aqueous pressure protection composition effective to increase the existing wellbore pressure by at least 5% (e.g., at least 10% at least 20%, at least 30%, at least 40%, at least 50%, at least 60%, at least 70%, at least 80%, at least 90%, at least 100%, at least 110%, at least 120%, at least 130%, at least 140%, at least 150%, at least 160%, at least 170%, at least 180%, at least 190%, at least 200%, at least 250%, at least 300%, at least 400%, or at least 500%). In some embodiments, step (a) can comprise injecting a volume of the aqueous pressure protection composition effective to increase the existing wellbore pressure by from 5% to 500% (e.g., from 50% to 500%, or from 100% to 500%).

In some examples, step (a) can comprise injecting the aqueous pressure protection composition at a pressure and flowrate effective to increase the existing wellbore pressure to from greater than the original reservoir pressure to 150% of the original reservoir pressure.

In some examples, step (a) can comprise injecting a volume of the aqueous pressure protection composition effective to increase the existing wellbore pressure to from greater than the original reservoir pressure to 150% of the original reservoir pressure.

The original reservoir fracture pressure and existing reservoir fracture pressure can be measured using standard methods. For example, the original reservoir fracture pressure can be measured using a mini-frac and DFIT method between drilling and fracturing to measure the original reservoir fracture pressure (see, for example, the methods described at http://www.fekete.com/SAN/TheoryAndEquations/WellTestTheoryEquations/Minifrac.htm). Likewise, the existing reservoir fracture pressure can be measured using a mini-frac and DFIT method between drilling and fracturing to measure the existing reservoir fracture pressure. Empirical equations, such as those described in Zhang et al. ("Fracture Gradient Prediction: An Overview and an Improved Method," Pet. Sci., 2017, 14: 720-730, which is hereby incorporated by reference), can be used to account for changes in stresses and pore pressure due to the depletion of fluids. The existing reservoir fracture pressure can also be measured in a laboratory using reservoir rock, fluids, and standard testing methods.

In some examples, step (a) can comprise injecting the aqueous pressure protection composition at a pressure and flowrate effective to increase the existing wellbore pressure to within 15% (e.g., ±15%) of existing reservoir fracture pressure (so as to not substantially refracture the existing wellbore). Step (b) can comprise injecting the aqueous pressure protection composition at least two weeks before fracturing, optionally injecting the aqueous pressure protection composition at least one week before fracturing, at least 5 days before fracturing, at least 4 days before fracturing, at least 3 days before fracturing, at least 2 days before fracturing, or at least 1 day before fracturing.

In some examples, step (a) can comprise injecting a volume of the aqueous pressure protection composition effective to increase the existing wellbore pressure to within 15% (e.g., ±15%) of existing reservoir fracture pressure (so as to not substantially refracture the rock matrix in proximity to the existing wellbore).

In some embodiments, the original reservoir pressure can be at least 4000 psia (e.g., at least 5000 psia, at least 6000 psia, at least 7000 psia, at least 8000 psia, or at least 9000 psia). In some embodiments, the original reservoir pressure can be 10000 psia or less (e.g., 9000 psia or less, 8000 psia or less, 7000 psia or less, 6000 psia or less, or 5000 psia or less). In some cases, the original reservoir pressure can range from any of the minimum values described above to any of the maximum values described above. For example, in some embodiments, the original reservoir pressure can be from 4000 psia to 10000 psia (e.g., from 5000 psia to 10000 psia).

In some embodiments, the original reservoir fracture pressure can be at least 5000 psia (e.g., at least 6000 psia, at least 7000 psia, at least 8000 psia, at least 9000 psia, at least 10000 psia, or at least 11000 psia). In some embodiments, the original reservoir fracture pressure can be 12000 psia or less (e.g., 11000 psia or less, 10000 psia or less, 9000 psia or less, 8000 psia or less, 7000 psia or less, 6000 psia or less, or 5000 psia or less).

In some cases, the original reservoir fracture pressure can range from any of the minimum values described above to any of the maximum values described above. For example, in some embodiments, the original reservoir fracture pressure can be from 5000 psia to 12000 psia (e.g., from 6000 psia to 10000 psia).

In some embodiments, the existing wellbore pressure can be at least 500 psia (e.g., at least 1000 psia, at least 2000 psia, at least 3000 psia, at least 4000 psia, or at least 5000 psia). In some embodiments, the existing wellbore pressure can be 6000 psia or less (e.g., 5000 psia or less, 4000 psia or less, 3000 psia or less, 2000 psia or less, or 1000 psia or less).

In some cases, the existing wellbore pressure can range from any of the minimum values described above to any of the maximum values described above. For example, in some embodiments, the existing wellbore pressure can be from 500 psia to 6000 psia (e.g., from 1000 psia to 4000 psia).

In some embodiments during a pressure protection operation described herein, the aqueous pressure protection composition can be injected at a pressure and flowrate effective to increase the existing wellbore pressure to at least 4000 psia (e.g., at least 5000 psia, at least 6000 psia, at least 7000, at least 8000 psia, or at least 9000 psia). In some embodiments during a pressure protection operation described herein, the aqueous pressure protection composition can be injected at a pressure and flowrate effective to increase the existing wellbore pressure to 10000 psia or less (e.g., 9000 psia or less, 8000 psia or less, 7000 psia or less, 6000 psia or less, or 5000 psia or less).

In some cases during a pressure protection operation described herein, the aqueous pressure protection composition can be injected at a pressure and flowrate effective to increase the existing wellbore pressure to a pressure ranging from any of the minimum values described above to any of the maximum values described above. For example, in some embodiments during a pressure protection operation described herein, the aqueous pressure protection composition can be injected at a pressure and flowrate effective to increase the existing wellbore pressure to from 4000 psia to 10000 psia.

In some embodiments during a pressure protection operation described herein, the volume of the aqueous pressure protection composition injected can be effective to increase the existing wellbore pressure to at least 4000 psia (e.g., at least 5000 psia, at least 6000 psia, at least 7000, at least 8000 psia, or at least 9000 psia). In some embodiments during a pressure protection operation described herein, the volume of the aqueous pressure protection composition injected can be effective to increase the existing wellbore pressure to 10000 psia or less (e.g., 9000 psia or less, 8000 psia or less, 7000 psia or less, 6000 psia or less, or 5000 psia or less).

In some cases during a pressure protection operation described herein, the volume of the aqueous pressure protection composition injected can be effective to increase the existing wellbore pressure to a pressure ranging from any of the minimum values described above to any of the maximum values described above. For example, in some embodiments during a pressure protection operation described herein, the volume of the aqueous pressure protection composition injected can be effective to increase the existing wellbore pressure to from 4000 psia to 10000 psia.

By way of example, in some embodiments, the original reservoir pressure can be approximately 6000-7000 psia, and an original reservoir fracture pressure of from approximately 8000-9000 psia. After 1 year of production, the existing wellbore can have a wellbore pressure substantially below original reservoir pressure. For example, after 1 year of production, the existing wellbore pressure can drop to approximately 3000-4000 psia. After more than a year, the existing wellbore pressure can drop even further (e.g., to approximately 2000-3000 psia). During a pressure protection operation described herein, the aqueous pressure protection composition can be injected at a pressure and flowrate effective to increase the existing wellbore pressure to approximately 4000-9000 psia.

In some embodiment, a single aqueous pressure protection composition can be injected into the existing wellbore. In other embodiments, injection of the aqueous pressure protection composition into the existing wellbore can comprise sequential injection of a series (e.g., two, three, four, or five) of aqueous pressure protection compositions of varying composition into the existing wellbore. The series of injections can, in combination, increase the existing wellbore pressure to its desired level for pressure protection of the existing wellbore.

By way of example, in some embodiments, injection can comprise injection of a first aqueous pressure protection composition into the existing wellbore followed by injection of a second aqueous pressure protection composition into the existing wellbore. In some of these embodiments, the first aqueous protection composition can be allowed to soak in contact with the formation for a period of time (e.g., for example, 1 hour, 2 hours, 6 hours, 12 hours, 24 hours, 48 hours, 72 hours, 1 week, 2 week, 3 weeks, 1 month or more) prior to injection of the second pressure protection composition. In some of these embodiments, the first aqueous pressure protection composition can comprise acid (e.g., HCl or HF). In some of these embodiments, the second aqueous pressure protection composition can comprise an alkali, a surfactant, or any combination thereof. In some of these embodiments, the total volume of the first aqueous pressure protection composition and the second aqueous pressure protection composition can be effective to increase the existing wellbore pressure to from greater than the original reservoir pressure to 150% of the original reservoir pressure. In some of these embodiments, methods can further comprise injection of a third pressure protection composition (e.g., a hydrocarbon solvent such as LPG, or a gas such as $CO_2$ or natural gas, as discussed in more detail below) into the existing wellbore.

In another embodiment, injection can comprise injection of a first aqueous pressure protection composition into the existing wellbore followed by injection of a second pressure protection composition into the existing wellbore. In some embodiments, the first aqueous pressure protection composition can comprise an alkali, a surfactant, or any combination thereof. In some embodiments, the second pressure protection composition can comprise a hydrocarbon solvent such as LPG, or a gas such as $CO_2$ or natural gas, as discussed in more detail below.

In another embodiment, injection can comprise alternating injections of an aqueous pressure protection composition (e.g., comprising an alkali, a surfactant, or any combination thereof) and a gas (e.g., $CO_2$ or natural gas). In some embodiments, injection can comprise injection of a first aqueous pressure protection composition (e.g., comprising an acid such as HCl or HF) followed by alternating injections of an aqueous pressure protection composition (e.g., an alkali, a surfactant, or any combination thereof) and a gas (e.g., $CO_2$ or natural gas).

In another embodiment, injection can comprise alternating injections of a pressure protection composition comprising a hydrocarbon solvent (e.g., a pressure protection composition comprising LPG) and a gas (e.g., $CO_2$ or natural gas). In some embodiments, injection can comprise injection of a first aqueous pressure protection composition (e.g., comprising an acid such as HCl or HF) followed by alternating injections of a pressure protection composition comprising a hydrocarbon solvent (e.g., a pressure protection composition comprising LPG) and a gas (e.g., $CO_2$ or natural gas).

The aqueous pressure protection composition can be injected into the existing wellbore prior to and/or during injection of a fracturing fluid into the unconventional subterranean formation via the new wellbore. The aqueous pressure protection composition can be maintained within the existing wellbore during the course of a fracturing operation performed in the new wellbore. If desired, injection of the aqueous pressure protection composition can be continued after completion of a fracturing operation performed using the new wellbore.

In some embodiments, methods can further comprise performing a fracturing operation in the new wellbore. For example, methods can further comprise injecting a fracturing fluid into the unconventional subterranean formation via the new wellbore at a sufficient pressure to create or extend at least one fracture in a rock matrix of the unconventional subterranean formation in a region proximate to the new wellbore.

In some embodiments, injection of the aqueous pressure protection composition in the existing wellbore impacts a direction, a geometry, or any combination thereof of the at least one fracture created or extended in the rock matrix during injection of the fracturing fluid into the unconventional subterranean formation via the new wellbore. For example, the aqueous protection composition in the existing wellbore can direct fracture formation away from the fractured region proximate to the existing wellbore, and towards virgin rock proximate to the new wellbore.

In some embodiments, the injection of the aqueous pressure protection composition in the existing wellbore can reduce entry of fluid, debris, or any combination thereof into the existing wellbore during injection of the fracturing fluid into the unconventional subterranean formation via the new wellbore.

In some embodiments, the method further comprises producing a hydrocarbon from the existing wellbore during and/or after the injection of the fracturing fluid into the unconventional subterranean formation via the new wellbore. In some embodiments, injection of the aqueous pressure protection composition into the existing wellbore can decrease the decline of a decline curve fit to production history of the existing wellbore.

In some embodiments, the method can further result in increased hydrocarbon recovery from the existing wellbore, the new wellbore, or any combination thereof. For example, injection of the aqueous pressure protection composition into the existing wellbore can result in increased hydrocarbon recovery from the existing wellbore as compared to an expected level of hydrocarbon recovery projected from a decline curve fit to production history of the existing wellbore. The decline curve can be fit to production history of the existing wellbore using, for example, Arp's Equation. Methods for determining decline curves for production wells are well known in the art. See, for example, "Estimating Ultimate Recovery of Developed Wells in Low-Permeability Reservoirs," Monograph 4, Society of Petroleum Engineers (ISBN 9781938330018) and "Guidelines for the Practical Evaluation of Undeveloped Reserves in Resource Plays," Monograph 3, Society of Petroleum Engineers (2010), each of which is hereby incorporated by reference in its entirety.

In some embodiments, injection of the aqueous pressure protection composition in the existing wellbore can increase the relative permeability in a region proximate to the existing wellbore.

In some embodiments, injection of the aqueous pressure protection composition in the existing wellbore releases hydrocarbons from pores in the rock matrix in the region proximate to the existing wellbore.

Optionally, in some embodiments, the method can further comprise modeling the existing wellbore and the region proximate to the existing wellbore to determine a volume of the aqueous pressure protection composition to be injected into the unconventional subterranean formation via the existing wellbore.

Also provided are methods for pressure protection of a first wellbore in proximity to a second wellbore. These methods can comprise injecting an aqueous pressure protection composition into the first wellbore in fluid communication with an unconventional subterranean formation prior to and/or during fracturing of the second wellbore in fluid communication with the unconventional subterranean formation. The first wellbore can have an existing reservoir pressure that is less than original reservoir pressure. The aqueous pressure protection solution can be injected at a pressure and flowrate effective to increase the first wellbore pressure without fracturing the first wellbore. The aqueous pressure protection solution can include a surfactant package including a first surfactant. A region of the unconventional subterranean formation in fluid communication with the first wellbore can be naturally fractured, can have been previously fractured one or more times (e.g., fractured, or fractured and refractured one or more times), or any combination thereof. The fracturing of the second wellbore can comprise fracturing or refracturing of a region of the unconventional subterranean formation in fluid communication with the second wellbore.

The methods described herein may involve one or more of the following:

(1) Determining which wells require preloading based on geomechanical analysis (e.g., performing preloading on all existing wells that lie on the fracture plane adjacent to the planned new child well).

(2) Preparing existing (parent or teenage) wells for preloading. This can include pulling/replacing any low pressure downhole valves that may be damaged during the new (child) well fracturing operation due to higher expected pressures. For example, a slickline intervention can be performed to retrieve low pressure side pocket mandrel valves used for gas lifted wells and the tubing, rods, and pump can be pulled on rod pump artificial lift wells. Existing wells may also be shut-in for a period of time prior to the preload operation.

(3) Installing downhole surveillance equipment to monitor pressure in existing (parent or teenage) wells. Use of pressure information may aid in identifying the ideal time period to perform fracturing operations in the child well, as well as, determining the amount of injection solution to use during a preload operation in the existing wells.

(4) Shutting-in the existing wells closer to the new child well for at least for 24 hours.

(5) Preloading existing wells closer to the new child well with larger amount of injection solution (e.g., injecting 20,000 bbls of injection solution in an existing parent well immediately adjacent to the new child well and injecting only 10,000 bbls of injection solution in an existing teenage well that is further from the new child well). Existing wells farther away from the new child well may alternatively be shut-in or continue producing instead of undergoing a preload operation.

(6) Pre-loading solution can be injected all at once or at different steps. For example, acid can be injected at the beginning to clean out the wellbore area and alter the rock wettability mixed with or followed by the surfactant and/or alkaline solutions.

(7) Preloading existing wells closer to the new child well with one injection solution and preloading existing wells farther from the new child well with a similar solution or a different injection solution.

(8) Injecting a sulfide scavenger with the injection solution to reduce the risk of sulfide stress cracking of wells if hydrogen sulfide has been detected or is a factor in the reservoir being produced.

(9) Swabbing in existing wells to unload preload fluids from the production tubing and return existing wells to production subsequent to performing the fracturing operation on the child well.

(10) Shut-in the pre-loaded existing wells during the fracturing of the new child well.

(11) Continuing injection of the aqueous pressure protection composition for a period of time after the new wellbore has been fractured.

Aqueous Pressure Protection Compositions

The aqueous pressure protection compositions described herein can include one or more components which can improve hydrocarbon recovery from the existing wellbore (e.g., following pressure protection/pre-loading with the aqueous pressure protection composition). Examples of such components include a surfactant package, an acid, an alkali agent, a co-solvent, a viscosity-modifying polymer, or any combination thereof.

Additional additives can also be incorporated in the aqueous pressure protection compositions, such as a chelating agent (e.g., EDTA or a salt thereof, for example, for use as an iron control agent), a clay swelling inhibitor (e.g., KCl), a biocide, a scale inhibitor, an anti-foam agent (e.g., chemical defoamer), a corrosion inhibitor, a sulfide scavenger, or any combination thereof.

The aqueous pressure protection compositions can comprise any type of water, treated or untreated, and can vary in salt content. For example, the aqueous pressure protection composition can comprise sea water, brackish water, flowback or produced water, wastewater (e.g., reclaimed or recycled), brine (e.g., reservoir or synthetic brine), fresh water (e.g., fresh water comprises<1,000 ppm TDS water), or any combination thereof. In some embodiments, the aqueous-based injection fluid can comprise slickwater.

In some embodiments, the aqueous pressure protection compositions can be substantially free of proppant particles.

In some embodiments, the aqueous pressure protection composition can be in the form of an aqueous solution. In these embodiments, the aqueous pressure protection compositions can comprise from 30% to 99.85% by weight of the total composition of water, for example from 70% to 98% water.

Acids

In some embodiments, the aqueous pressure protection composition can comprise an acid. The acid can comprise any suitable acid known in the art. In some embodiments, the acid can comprise a strong acid, such as HCl, HF, or any combination thereof. In other embodiments, the acid can comprise a weak acid, such as an organic acid (e.g., acetic acid, citric acid, tartric acid, or any combination thereof).

In some embodiments, the aqueous pressure protection composition can have a pH of at least 2 (e.g., at least 2.5, at least 3, at least 3.5, at least 4, at least 4.5, at least 5, or at least 5.5). In some embodiments, the aqueous pressure protection composition can have a pH of 6 or less (e.g., 5.5 or less, 5 or less, 4.5 or less, 4 or less, 3.5 or less, 3 or less, or 2.5 or less).

The aqueous pressure protection composition can have a pH ranging from any of the minimum values described above to any of the maximum values described above. For example, in some embodiments, the aqueous pressure protection composition can have a pH of from 2 to 6 (e.g., from 2 to 5.5, from 2 to 4, or from 2 to 3).

Alkali Agents

In some embodiments, the aqueous pressure protection composition can comprise an alkali agent.

The term "alkali agent" is used herein according to its conventional meaning and includes basic, ionic salts of alkali metals or alkaline earth metals. Alkali agents as provided herein are typically capable of reacting with an unrefined petroleum acid (e.g., an acid in crude oil (reactive oil)) to form soap (a surfactant salt of a fatty acid) in situ. These in situ generated soaps serve as a source of surfactants capable of reducing the interfacial tension of hydrocarbons with an aqueous composition. Examples of suitable alkali agents include, but are not limited to, sodium hydroxide, potassium hydroxide, sodium carbonate, potassium carbonate, sodium silicate, sodium metaborate, and salts of EDTA (e.g., EDTA tetrasodium salt or EDTA tetrapotassium salt). In one embodiment, the alkali agent is NaOH. In other embodiments, the alkali agent is $Na_2CO_3$.

In some embodiments, the aqueous pressure protection composition can have a pH of at least 8 (e.g., at least 8.5, at least 9, at least 9.5, at least 10, at least 10.5, at least 11, or at least 11.5). In some embodiments, the aqueous pressure protection composition can have a pH of 12 or less (e.g., 11.5 or less, 11 or less, 10.5 or less, 10 or less, 9.5 or less, 9 or less, or 8.5 or less).

The aqueous pressure protection composition can have a pH ranging from any of the minimum values described above to any of the maximum values described above. For example, in some embodiments, the aqueous pressure protection composition can have a pH of from 8 to 12 (e.g., from 8.5 to 12, from 9 to 12, from 8.5 to 11.5, from 9 to 11.5, from 8.5 to 11, or from 9 to 11).

Co-Solvents

In some embodiments, the aqueous pressure protection composition can comprise a co-solvent. The co-solvent can comprise any suitable water-miscible solvent.

Suitable co-solvents include alcohols, such as lower carbon chain alcohols such as isopropyl alcohol, ethanol, n-propyl alcohol, n-butyl alcohol, sec-butyl alcohol, n-amyl alcohol, sec-amyl alcohol, n-hexyl alcohol, sec-hexyl alcohol and the like; alcohol ethers, polyalkylene alcohol ethers, polyalkylene glycols, poly(oxyalkylene)glycols, poly(oxyalkylene)glycol ethers, ethoxylated phenol, or any other common organic co-solvent or combinations of any two or more co-solvents. In one embodiment, the co-solvent can comprise alkyl ethoxylate (C1-C6)-XEO X=1-30-linear or branched. In some embodiments, the co-solvent can comprise ethylene glycol butyl ether (EGBE), diethylene glycol monobutyl ether (DGBE), triethylene glycol monobutyl ether (TEGBE), ethylene glycol dibutyl ether (EGDE), polyethylene glycol monomethyl ether (mPEG), dimethyl ether, or any combination thereof. Examples of suitable co-solvents are also described in U.S. Pat. No. 10,337,303, which is incorporated by reference herein in its entirety.

In some embodiments, the co-solvent can be present in the aqueous pressure protection composition in an amount of from 0.1% to 25% by weight (e.g. from 0.1% to 10% by weight, or from 0.5% to 5% by weight) of the total weight of the aqueous pressure protection composition.

Viscosity-Modifying Polymers

In some embodiments, the aqueous pressure protection composition can comprise a viscosity-modifying polymer.

Examples of viscosity-modifying polymer are known in the art. Examples of suitable polymers include biopolymers such as polysaccharides. For example, polysaccharides can be xanthan gum, scleroglucan, guar gum, a mixture thereof (e.g., any modifications thereof such as a modified chain), etc. Indeed, the terminology "mixtures thereof" or "combinations thereof" can include "modifications thereof" herein. Examples of suitable synthetic polymers include polyacrylamides. Examples of suitable polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the synthetic polymer is polyacrylic acid (PAA). In one embodiment, the synthetic polymer is polyvinyl alcohol (PVA). Copolymers may be made of any combination or mixture above, for example, a combination of NVP and ATBS.

In some embodiments, the viscosity-modifying polymer can be present in the aqueous pressure protection composition in an amount of from 0.1% to 25% by weight (e.g. from 0.1% to 10% by weight, or from 0.5% to 5% by weight) of the total weight of the aqueous pressure protection composition.

Surfactant Packages

Suitable surfactant packages can comprise a primary surfactant and optionally one or more secondary surfactants.

In some cases, the primary surfactant can comprise an anionic surfactant. In these cases, one or more secondary surfactants can comprise one or more non-ionic surfactants, one or more additional anionic surfactants, one or more cationic surfactants, one or more zwitterionic surfactants, or any combination thereof.

In other cases, the primary surfactant can comprise a non-ionic surfactant. In these cases, one or more secondary surfactants can comprise one or more additional non-ionic surfactants, one or more anionic surfactants, one or more cationic surfactants, one or more zwitterionic surfactants, or any combination thereof.

In other cases, the primary surfactant can comprise a cationic surfactant. In these cases, one or more secondary surfactants can comprise one or more non-ionic surfactants, one or more anionic surfactants, one or more additional cationic surfactants, one or more zwitterionic surfactants, or any combination thereof.

In other cases, the primary surfactant can comprise a zwitterionic surfactant. In these cases, one or more secondary surfactants can comprise one or more non-ionic surfactants, one or more anionic surfactants, one or more cationic surfactants, one or more additional zwitterionic surfactants, or any combination thereof.

In some embodiments, the primary surfactant can comprise at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous pressure protection composition, based on the total weight of the aqueous pressure protection composition. In some embodiments, the primary surfactant can comprise 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous pressure protection composition, based on the total weight of the aqueous pressure protection composition.

The primary surfactant can be present in the aqueous pressure protection composition in an amount ranging from any of the minimum values described above to any of the maximum values described above. For example, in some embodiments, the primary surfactant can comprise from 10% to 90% by weight (e.g., from 10% to 50% by weight) of the aqueous pressure protection composition, based on the total weight of the aqueous pressure protection composition.

In some embodiments, the one or more secondary surfactants can comprise at least 10% by weight (e.g., at least 15% by weight, at least 20% by weight, at least 25% by weight, at least 30% by weight, at least 35% by weight, at least 40% by weight, at least 45% by weight, at least 50% by weight, at least 55% by weight, at least 60% by weight, at least 65% by weight, at least 70% by weight, at least 75% by weight, at least 80% by weight, or at least 85% by weight) of the aqueous pressure protection composition, based on the total weight of the aqueous pressure protection composition. In some embodiments, the one or more secondary surfactants can comprise 90% by weight or less (e.g., 85% by weight or less, 80% by weight or less, 75% by weight or less, 70% by weight or less, 65% by weight or less, 60% by weight or less, 55% by weight or less, 50% by weight or less, 45% by weight or less, 40% by weight or less, 35% by weight or less, 30% by weight or less, 25% by weight or less, 20% by weight or less, or 15% by weight or less) of the aqueous pressure protection composition, based on the total weight of the aqueous pressure protection composition.

The one or more secondary surfactants can be present in the aqueous pressure protection composition in an amount ranging from any of the minimum values described above to any of the maximum values described above. For example, in some embodiments, the one or more secondary surfactants can comprise from 10% to 90% by weight (e.g., from 10% to 50% by weight) of the aqueous pressure protection composition, based on the total weight of the aqueous pressure protection composition.

In some embodiments, the aqueous pressure protection composition can comprise an anionic surfactant. In other embodiments, the aqueous pressure protection composition can consist essentially of an anionic surfactant (i.e., the anionic surfactant is the only surfactant present in the aqueous pressure protection composition). In other embodiments, the aqueous pressure protection composition can consist of an anionic surfactant. In some of these embodiments, the aqueous pressure protection composition further includes water. In some of these embodiments, the aqueous pressure protection composition does not comprise a hydrocarbon.

In some embodiments, the aqueous pressure protection composition can comprise an anionic surfactant and a non-ionic surfactant. In other embodiments, the aqueous pressure protection composition can consist essentially of an anionic surfactant and a non-ionic surfactant (i.e., the anionic surfactant and the non-ionic surfactant are the only surfactants present in the aqueous pressure protection composition). In other embodiments, the aqueous pressure protection composition can consist of an anionic surfactant and a non-ionic surfactant. In some of these embodiments, the aqueous pressure protection composition further includes water. In some of these embodiments, the aqueous pressure protection composition does not comprise a hydrocarbon.

In some embodiments, the aqueous pressure protection composition can comprise an anionic surfactant, a second anionic surfactant, and a non-ionic surfactant. In other embodiments, the aqueous pressure protection composition can consist essentially of an anionic surfactant, a second anionic surfactant, and a non-ionic surfactant (i.e., the anionic surfactant, the second anionic surfactant, and the non-ionic surfactant are the only surfactants present in the aqueous pressure protection composition). In other embodiments, the aqueous pressure protection composition can consist of an anionic surfactant, a second anionic surfactant, and a non-ionic surfactant. In some of these embodiments, the aqueous pressure protection composition further includes water. In some of these embodiments, the aqueous pressure protection composition does not comprise a hydrocarbon.

In some embodiments, the aqueous pressure protection composition can comprise a non-ionic surfactant. In other embodiments, the aqueous pressure protection composition can consist essentially of a non-ionic surfactant (i.e., the non-ionic surfactant is the only surfactant present in the aqueous pressure protection composition). In other embodiments, the aqueous pressure protection composition can consist of a non-ionic surfactant. In some of these embodiments, the aqueous pressure protection composition further includes water. In some of these embodiments, the aqueous pressure protection composition does not comprise a hydrocarbon.

In some embodiments, the aqueous pressure protection composition can comprise a non-ionic surfactant, an anionic surfactant, and a second anionic surfactant. In other embodiments, the aqueous pressure protection composition can consist essentially of a non-ionic surfactant, an anionic surfactant, and a second anionic surfactant (i.e., the anionic surfactant, the second anionic surfactant, and the non-ionic surfactant are the only surfactants present in the aqueous pressure protection composition). In other embodiments, the aqueous pressure protection composition can consist of a non-ionic surfactant, an anionic surfactant, and a second anionic surfactant. In some of these embodiments, the aqueous pressure protection composition further includes water. In some of these embodiments, the aqueous pressure protection composition does not comprise a hydrocarbon.

Suitable anionic surfactants for use as a primary surfactant and/or a secondary surfactant include a hydrophobic tail that comprises from 6 to 60 carbon atoms. In some embodiments, the anionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the anionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The anionic surfactant can include a hydrophobic tail that comprises a number of carbon atoms ranging from any of the minimum values described above to any of the maximum values described above. For example, in some embodiments, the anionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. The hydrophobic (lipophilic) carbon tail may be a straight chain, branched chain, and/or may comprise cyclic structures. The hydrophobic carbon tail may comprise single bonds, double bonds, triple bonds, or any combination thereof. In some embodiments, the anionic surfactant can include a branched hydrophobic tail derived from Guerbet alcohols. The hydrophilic portion of the anionic surfactant can comprise, for example, one or more sulfate moieties (e.g., one, two, or three sulfate moieties), one or more sulfonate moieties (e.g., one, two, or three sulfonate moieties), one or more sulfosuccinate moieties (e.g., one, two, or three sulfosuccinate moieties), one or more carboxylate moieties (e.g., one, two, or three carboxylate moieties), or any combination thereof.

In some embodiments, the anionic surfactant can comprise, for example a sulfonate, a disulfonate, a polysulfonate, a sulfate, a disulfate, a polysulfate, a sulfosuccinate, a disulfosuccinate, a polysulfosuccinate, a carboxylate, a dicarboxylate, a polycarboxylate, or any combination thereof. In some embodiments, the anionic surfactant can comprise, for example a sulfonate, a disulfonate, a sulfate, a disulfate, a sulfosuccinate, a disulfosuccinate, a carboxylate, a dicarboxylate, or any combination thereof. In some examples, the anionic surfactant can comprise an internal olefin sulfonate (IOS), an isomerized olefin sulfonate, an alfa olefin sulfonate (AOS), an alkyl aryl sulfonate (AAS), a xylene sulfonate, an alkane sulfonate, a petroleum sulfonate, an alkyl diphenyl oxide (di)sulfonate, an alcohol sulfate, an alkoxy sulfate, an alkoxy sulfonate, an alkoxy carboxylate, an alcohol phosphate, or an alkoxy phosphate. In some embodiments, the anionic surfactant can comprise an alkoxy carboxylate surfactant, an alkoxy sulfate surfactant, an alkoxy sulfonate surfactant, an alkyl sulfonate surfactant, an aryl sulfonate surfactant, or an olefin sulfonate surfactant.

An "alkoxy carboxylate surfactant" or "alkoxy carboxylate" refers to a compound having an alkyl or aryl attached to one or more alkoxylene groups (typically —CH$_2$—CH (ethyl)-O—, —CH$_2$—CH(methyl)-O—, or —CH$_2$—CH$_2$—O—) which, in turn is attached to —COO$^-$ or acid or salt thereof including metal cations such as sodium. In embodiments, the alkoxy carboxylate surfactant can be defined by the formulae below:

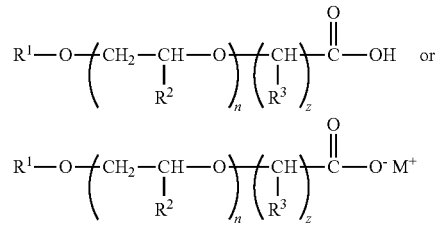

wherein $R^1$ is substituted or unsubstituted C6-C36 alkyl or substituted or unsubstituted aryl; $R^2$ is, independently for each occurrence within the compound, hydrogen or unsubstituted C1-C6 alkyl; $R^3$ is independently hydrogen or unsubstituted C1-C6 alkyl, n is an integer from 0 to 175, z is an integer from 1 to 6 and $M^+$ is a monovalent, divalent or trivalent cation. In some of these embodiments, $R^1$ can be an unsubstituted linear or branched C6-C36 alkyl.

In certain embodiments, the alkoxy carboxylate can be a C6-C32:PO(0-65):EO(0-100)-carboxylate (i.e., a C6-C32 hydrophobic tail, such as a branched or unbranched C6-C32 alkyl group, attached to from 0 to 65 propyleneoxy groups (—CH$_2$—CH(methyl)-O— linkers), attached in turn to from 0 to 100 ethyleneoxy groups (—CH$_2$—CH$_2$—O— linkers), attached in turn to —COO$^-$ or an acid or salt thereof including metal cations such as sodium). In certain embodiments, the alkoxy carboxylate can be a branched or unbranched C6-C30:PO(30-40):EO(25-35)-carboxylate. In certain embodiments, the alkoxy carboxylate can be a branched or unbranched C6-C12:PO(30-40):EO(25-35)-carboxylate. In certain embodiments, the alkoxy carboxylate can be a branched or unbranched C6-C30:EO(8-30)-carboxylate.

An "alkoxy sulfate surfactant" or "alkoxy sulfate" refers to a surfactant having an alkyl or aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium. In some embodiment, the alkoxy sulfate surfactant has the formula R—(BO)$_e$—(PO)$_f$-(EO)$_g$—SO$_3^-$ or acid or salt (including metal cations such as sodium) thereof, wherein R is C6-C32 alkyl, BO is —CH$_2$—CH(ethyl)-O—, PO is —CH$_2$—CH(methyl)-O—, and EO is —CH$_2$—CH$_2$—O—. The symbols e, f and g are integers from 0 to 50 wherein at least one is not zero.

In embodiments, the alkoxy sulfate surfactant can be an aryl alkoxy sulfate surfactant. The aryl alkoxy surfactant can be an alkoxy surfactant having an aryl attached to one or more alkoxylene groups (typically —CH$_2$—CH(ethyl)-O—, —CH$_2$—CH(methyl)-O—, or —CH$_2$—CH$_2$—O—) which, in turn is attached to —SO$_3^-$ or acid or salt thereof including metal cations such as sodium.

An "alkyl sulfonate surfactant" or "alkyl sulfonate" refers to a compound that includes an alkyl group (e.g., a branched or unbranched C6-C32 alkyl group) attached to —SO$_3^-$ or acid or salt thereof including metal cations such as sodium.

An "aryl sulfate surfactant" or "aryl sulfate" refers to a compound having an aryl group attached to —O—SO$_3^-$ or acid or salt thereof including metal cations such as sodium. An "aryl sulfonate surfactant" or "aryl sulfonate" refers to a compound having an aryl group attached to —SO$_3^-$ or acid or salt thereof including metal cations such as sodium. In some cases, the aryl group can be substituted, for example, with an alkyl group (an alkyl aryl sulfonate).

An "internal olefin sulfonate," "isomerized olefin sulfonate," or "IOS" refers to an unsaturated hydrocarbon compound comprising at least one carbon-carbon double bond and at least one SO$_3^-$ group, or a salt thereof. As used herein, a "C20-C28 internal olefin sulfonate," "a C20-C28 isomerized olefin sulfonate," or "C20-C28 IOS" refers to an IOS, or a mixture of IOSs with an average carbon number of 20 to 28, or of 23 to 25. The C20-C28 IOS may comprise at least 80% of IOS with carbon numbers of 20 to 28, at least 90% of IOS with carbon numbers of 20 to 28, or at least 99% of IOS with carbon numbers of 20 to 28. As used herein, a "C15-C18 internal olefin sulfonate," "C15-C18 isomerized olefin sulfonate," or "C15-C18 IOS" refers to an IOS or a mixture of IOSs with an average carbon number of 15 to 18, or of 16 to 17. The C15-C18 IOS may comprise at least 80% of IOS with carbon numbers of 15 to 18, at least 90% of IOS with carbon numbers of 15 to 18, or at least 99% of IOS with carbon numbers of 15 to 18. The internal olefin sulfonates or isomerized olefin sulfonates may be alpha olefin sulfonates, such as an isomerized alpha olefin sulfonate. The internal olefin sulfonates or isomerized olefin sulfonates may also comprise branching. In certain embodiments, C15-18 IOS may be added to the single-phase liquid surfactant package when the LPS injection fluid is intended for use in high temperature unconventional subterranean formations, such as formations above 130° F. (approximately 55° C.). The IOS may be at least 20% branching, 30% branching, 40% branching, 50% branching, 60% branching, or 65% branching. In some embodiments, the branching is between 20-98%, 30-90%, 40-80%, or around 65%. Examples of internal olefin sulfonates and the methods to make them are found in U.S. Pat. No. 5,488,148, U.S. Patent Application Publication 2009/0112014, and SPE 129766, all incorporated herein by reference.

In embodiments, the anionic surfactant can be a disulfonate, alkyldiphenyloxide disulfonate, mono alkyldiphenyloxide disulfonate, di alkyldiphenyloxide disulfonate, or a di alkyldiphenyloxide monosulfonate, where the alkyl group can be a C6-C36 linear or branched alkyl group. In embodiments, the anionic surfactant can be an alkylbenzene sulfonate or a dibenzene disulfonate. In embodiments, the anionic surfactant can be benzenesulfonic acid, decyl(sulfophenoxy)-disodium salt; linear or branched C6-C36 alkyl: PO(0-65):EO(0-100) sulfate; or linear or branched C6-C36 alkyl:PO(0-65):EO(0-100) carboxylate. In embodiments, the anionic surfactant is an isomerized olefin sulfonate (C6-C30), internal olefin sulfonate (C6-C30) or internal olefin disulfonate (C6-C30). In some embodiments, the anionic surfactant is a Guerbet-PO(0-65)-EO(0-100) sulfate (Guerbet portion can be C6-C36). In some embodiments, the anionic surfactant is a Guerbet-PO(0-65)-EO(0-100) carboxylate (Guerbet portion can be C6-C36). In some embodiments, the anionic surfactant is alkyl PO(0-65) and EO(0-100) sulfonate: where the alkyl group is linear or branched C6-C36. In some embodiments, the anionic surfactant is a sulfosuccinate, such as a dialkylsulfosuccinate. In some embodiments, the anionic surfactant is an alkyl aryl sulfonate (AAS) (e.g. an alkyl benzene sulfonate (ABS)), a C10-C30 internal olefin sulfate (IOS), a petroleum sulfonate, or an alkyl diphenyl oxide (di) sulfonate.

In some examples, the anionic surfactant can comprise a surfactant defined by the formula below:

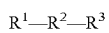

wherein R$^1$ comprises a branched or unbranched, saturated or unsaturated, cyclic or non-cyclic, hydrophobic carbon chain having 6-32 carbon atoms and an oxygen atom linking R$^1$ and R$^2$; R$^2$ comprises an alkoxylated chain comprising at least one oxide group selected from the group consisting of ethylene oxide, propylene oxide, butylene oxide, and combinations thereof; and R$^3$ comprises a branched or unbranched hydrocarbon chain comprising 2-12 carbon atoms and from 2 to 5 carboxylate groups.

In some examples, the anionic surfactant can comprise a surfactant defined by the formula below:

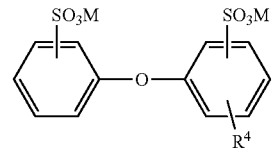

wherein R$^4$ is a branched or unbranched, saturated or unsaturated, cyclic or non-cyclic, hydrophobic carbon chain having 6-32 carbon atoms; and M represents a counterion (e.g., Na$^+$, K$^+$). In some embodiments, R$^4$ is a branched or unbranched, saturated or unsaturated, cyclic or non-cyclic, hydrophobic carbon chain having 6-16 carbon atoms.

Suitable non-ionic surfactants for use as a primary surfactant and/or a secondary surfactant include compounds that can be added to increase wettability. In embodiments, the hydrophilic-lipophilic balance (HLB) of the non-ionic surfactant is greater than 10 (e.g., greater than 9, greater than 8, or greater than 7). In some embodiments, the HLB of the non-ionic surfactant is from 7 to 10.

The non-ionic surfactant can comprise a hydrophobic tail comprising from 6 to 60 carbon atoms. In some embodiments, the non-ionic surfactant can include a hydrophobic tail that comprises at least 6 carbon atoms (e.g., at least 7 carbon atoms, at least 8 carbon atoms, at least 9 carbon atoms, at least 10 carbon atoms, at least 11 carbon atoms, at least 12 carbon atoms, at least 13 carbon atoms, at least 14 carbon atoms, at least 15 carbon atoms, at least 16 carbon atoms, at least 17 carbon atoms, at least 18 carbon atoms, at least 19 carbon atoms, at least 20 carbon atoms, at least 21 carbon atoms, at least 22 carbon atoms, at least 23 carbon atoms, at least 24 carbon atoms, at least 25 carbon atoms, at least 26 carbon atoms, at least 27 carbon atoms, at least 28 carbon atoms, at least 29 carbon atoms, at least 30 carbon atoms, at least 31 carbon atoms, at least 32 carbon atoms, at least 33 carbon atoms, at least 34 carbon atoms, at least 35 carbon atoms, at least 36 carbon atoms, at least 37 carbon atoms, at least 38 carbon atoms, at least 39 carbon atoms, at least 40 carbon atoms, at least 41 carbon atoms, at least 42 carbon atoms, at least 43 carbon atoms, at least 44 carbon atoms, at least 45 carbon atoms, at least 46 carbon atoms, at least 47 carbon atoms, at least 48 carbon atoms, at least 49 carbon atoms, at least 50 carbon atoms, at least 51 carbon atoms, at least 52 carbon atoms, at least 53 carbon atoms, at least 54 carbon atoms, at least 55 carbon atoms, at least 56 carbon atoms, at least 57 carbon atoms, at least 58 carbon atoms, or at least 59 carbon atoms). In some embodiments, the non-ionic surfactant can include a hydrophobic tail that comprises 60 carbon atoms or less (e.g., 59 carbon atoms or less, 58 carbon atoms or less, 57 carbon atoms or less, 56 carbon atoms or less, 55 carbon atoms or less, 54 carbon atoms or less, 53 carbon atoms or less, 52 carbon atoms or less, 51 carbon atoms or less, 50 carbon atoms or less, 49 carbon atoms or less, 48 carbon atoms or less, 47 carbon atoms or less, 46 carbon atoms or less, 45 carbon atoms or less, 44 carbon atoms or less, 43 carbon atoms or less, 42 carbon atoms or less, 41 carbon atoms or less, 40 carbon atoms or less, 39 carbon atoms or less, 38 carbon atoms or less, 37 carbon atoms or less, 36 carbon atoms or less, 35 carbon atoms or less, 34 carbon atoms or less, 33 carbon atoms or less, 32 carbon atoms or less, 31 carbon atoms or less, 30 carbon atoms or less, 29 carbon atoms or less, 28 carbon atoms or less, 27 carbon atoms or less, 26 carbon atoms or less, 25 carbon atoms or less, 24 carbon atoms or less, 23 carbon atoms or less, 22 carbon atoms or less, 21 carbon atoms or less, 20 carbon atoms or less, 19 carbon atoms or less, 18 carbon atoms or less, 17 carbon atoms or less, 16 carbon atoms or less, 15 carbon atoms or less, 14 carbon atoms or less, 13 carbon atoms or less, 12 carbon atoms or less, 11 carbon atoms or less, 10 carbon atoms or less, 9 carbon atoms or less, 8 carbon atoms or less, or 7 carbon atoms or less).

The non-ionic surfactant can include a hydrophobic tail that comprises a number of carbon atoms ranging from any of the minimum values described above to any of the maximum values described above. For example, in some embodiments, the non-ionic surfactant can comprise a hydrophobic tail comprising from 6 to 15, from 16 to 30, from 31 to 45, from 46 to 60, from 6 to 25, from 26 to 60, from 6 to 30, from 31 to 60, from 6 to 32, from 33 to 60, from 6 to 12, from 13 to 22, from 23 to 32, from 33 to 42, from 43 to 52, from 53 to 60, from 6 to 10, from 10 to 15, from 16 to 25, from 26 to 35, or from 36 to 45 carbon atoms. In some cases, the hydrophobic tail may be a straight chain, branched chain, and/or may comprise cyclic structures. The hydrophobic carbon tail may comprise single bonds, double bonds, triple bonds, or any combination thereof. In some cases, the hydrophobic tail can comprise an alkyl group, with or without an aromatic ring (e.g., a phenyl ring) attached to it. In some embodiments, the hydrophobic tail can comprise a branched hydrophobic tail derived from Guerbet alcohols.

Example non-ionic surfactants include alkyl aryl alkoxy alcohols, alkyl alkoxy alcohols, or any combination thereof. In embodiments, the non-ionic surfactant may be a mix of surfactants with different length lipophilic tail chain lengths. For example, the non-ionic surfactant may be C9-C11:9EO, which indicates a mixture of non-ionic surfactants that have a lipophilic tail length of 9 carbon to 11 carbon, which is followed by a chain of 9 EOs. The hydrophilic moiety is an alkyleneoxy chain (e.g., an ethoxy (EO), butoxy (BO) and/or propoxy (PO) chain with two or more repeating units of EO, BO, and/or PO). In some embodiments, 1-100 repeating units of EO are present. In some embodiments, 0-65 repeating units of PO are present. In some embodiments, 0-25 repeating units of BO are present. For example, the non-ionic surfactant could comprise 10EO:5PO or 5EO. In embodiments, the non-ionic surfactant may be a mix of surfactants with different length lipophilic tail chain lengths. For example, the non-ionic surfactant may be C9-C11:PO9: EO2, which indicates a mixture of non-ionic surfactants that have a lipophilic tail length of 9 carbon to 11 carbon, which is followed by a chain of 9 POs and 2 EOs. In specific embodiments, the non-ionic surfactant is linear C9-C11: 9EO. In some embodiments, the non-ionic surfactant is a Guerbet PO(0-65) and EO(0-100) (Guerbet can be C6-C36); or alkyl PO(0-65) and EO(0-100): where the alkyl group is linear or branched C1-C36. In some examples, the non-ionic surfactant can comprise a branched or unbranched C6-C32: PO(0-65):EO(0-100) (e.g., a branched or unbranched C6-C30:PO(30-40):EO(25-35), a branched or unbranched C6-C12:PO(30-40):EO(25-35), a branched or unbranched C6-30:EO(8-30), or any combination thereof). In some embodiments, the non-ionic surfactant is one or more alkyl polyglucosides.

Example cationic surfactants include surfactant analogous to those described above, except bearing primary, secondary, or tertiary amines, or quaternary ammonium cations, as a hydrophilic head group. "Zwitterionic" or "zwitterion" as used herein refers to a neutral molecule with a positive (or cationic) and a negative (or anionic) electrical charge at different locations within the same molecule. Example zwitterionic surfactants include betains and sultains.

Examples of suitable surfactants are disclosed, for example, in U.S. Pat. Nos. 3,811,504, 3,811,505, 3,811,507, 3,890,239, 4,463,806, 6,022,843, 6,225,267, 7,629,299, 7,770,641, 9,976,072, 8,211, 837, 9,422,469, 9,605,198, and 9,617,464, 8,822,391, 9,783,729, 8,372,788; WIPO Patent Application Nos. WO/2008/079855; as well as U.S. Patent Application Publication Nos. 2005/0199395, 2006/0185845, 2006/0189486, 2009/0270281, 2011/0046024, 2011/0100402, 2011/0190175, 2007/0191633, 2010/004843, 2011/0201531, 2011/0190174, 2011/0071057, 2011/0059873, 2011/0059872, 2011/0048721, 2010/0319920, 2010/0292110, and 2017/0198202, each of which is hereby incorporated by reference herein in its entirety for its description of example surfactants.

The primary surfactant can have a concentration within the aqueous pressure protection composition of at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous pressure protection composition. In some embodiments, the primary surfactant can have a concentration within the aqueous pressure protection composition of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous pressure protection composition. In particular embodiments, the primary surfactant can have a concentration within the aqueous pressure protection composition of less than 1%, less than 0.5%, less than 0.2%, less than 0.1%, less than 0.075%, or less than 0.05%.

The primary surfactant can have a concentration within the aqueous pressure protection composition ranging from any of the minimum values described above to any of the maximum values described above. For example, in some embodiments, the primary surfactant can have a concentration within the aqueous pressure protection composition of from 0.01% to 2.5% by weight (e.g., from 0.05% to 0.5% by weight), based on the total weight of the aqueous pressure protection composition.

When present, the one or more secondary surfactants can have a concentration within the aqueous pressure protection composition of at least 0.001% by weight (e.g., at least 0.005% by weight, at least 0.01% by weight, at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, or at least 2.25% by weight), based on the total weight of the aqueous pressure protection composition. In some embodiments, the one or more secondary surfactants can have a concentration within the aqueous pressure protection composition of 2.5% by weight or less (e.g., 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, 0.02% by weight or less, 0.01% by weight or less, or 0.005% by weight or less), based on the total weight of the aqueous pressure protection composition. In particular embodiments, the one or more secondary surfactants can have a concentration within the aqueous pressure protection composition of less than 2%, less than 1.5%, less than 1%, less than 0.5%, less than 0.2%, less than 0.1%, less than 0.075%, less than 0.05%, or less than 0.01%.

When present, the one or more secondary surfactants can have a concentration within the aqueous pressure protection composition ranging from any of the minimum values described above to any of the maximum values described above. For example, in some embodiments, the one or more secondary surfactants can have a concentration within the aqueous pressure protection composition of from 0.001% to 2.5% by weight (e.g., from 0.001% to 1.5% by weight, or from 0.05% to 0.5% by weight), based on the total weight of the aqueous pressure protection composition.

In some embodiments, the primary surfactant and one or more secondary surfactants can be present in the aqueous pressure protection composition at a weight ratio of primary surfactant to one or more secondary surfactants of at least 1:1 (e.g., at least 2:1, at least 2.5:1, at least 3:1, at least 4:1, at least 5:1, at least 6:1, at least 7:1, at least 8:1, or at least 9:1). In some embodiments, the primary surfactant and one or more secondary surfactants can be present in the aqueous pressure protection composition in a weight ratio of primary surfactant to one or more secondary surfactants of 10:1 or less (e.g., 9:1 or less; 8:1 or less, 7:1 or less, 6:1 or less, 5:1 or less, 4:1 or less, 3:1 or less, 2.5:1 or less, or 2:1 or less).

The primary surfactant and one or more secondary surfactants can be present in the aqueous pressure protection composition in a weight ratio ranging from any of the minimum values described above to any of the maximum values described above. For example, the primary surfactant and one or more secondary surfactants can be present in the aqueous pressure protection composition in a weight ratio of primary surfactant to one or more secondary surfactants of from 1:1 to 10:1 (e.g., 1:1 to 5:1).

In other embodiments, the one or more secondary surfactants are absent (i.e., the primary surfactant is the only surfactant present in the aqueous pressure protection composition).

In some embodiments, the total concentration of all surfactants in the aqueous pressure protection composition (the total concentration of the primary surfactant and the one or more secondary surfactants in the aqueous pressure protection composition) can be at least 0.01% by weight (e.g., at least 0.02% by weight, at least 0.03% by weight, at least 0.04% by weight, at least 0.05% by weight, at least 0.06% by weight, at least 0.07% by weight, at least 0.08% by weight, at least 0.09% by weight, at least 0.1% by weight, at least 0.15% by weight, at least 0.2% by weight, at least 0.25% by weight, at least 0.3% by weight, at least 0.35% by weight, at least 0.4% by weight, at least 0.45% by weight, at least 0.5% by weight, at least 0.55% by weight, at least 0.6% by weight, at least 0.65% by weight, at least 0.7% by weight, at least 0.75% by weight, at least 0.8% by weight, at least 0.85% by weight, at least 0.9% by weight, at least 0.95% by weight, at least 1% by weight, at least 1.25% by weight, at least 1.5% by weight, at least 1.75% by weight, at least 2% by weight, at least 2.25% by weight, at least 2.5% by weight, at least 2.75% by weight, at least 3% by weight, at least 3.25% by weight, at least 3.5% by weight, at least 3.75% by weight, at least 4% by weight, at least 4.25% by weight, at least 4.5% by weight, or at least 4.75% by weight), based on the total weight of the aqueous pressure protection composition. In some embodiments, the total concentration of all surfactants in the aqueous pressure protection composition (the total concentration of the primary surfactant and the one or more secondary surfactants in the aqueous pressure protection composition) can be 5% by weight or less (e.g., 4.75% by weight or less, 4.5% by weight or less, 4.25% by weight or less, 4% by weight or less, 3.75% by weight or less, 3.5% by weight or less, 3.25% by weight or less, 3% by weight or less, 2.75% by weight or less, 2.5% by weight or less, 2.25% by weight or less, 2% by weight or less, 1.75% by weight or less, 1.5% by weight or less, 1.25% by weight or less, 1% by weight or less, 0.95% by weight or less, 0.9% by weight or less, 0.85% by weight or less, 0.8% by weight or less, 0.75% by weight or less, 0.7% by weight or less, 0.65% by weight or less, 0.6% by weight or less, 0.55% by weight or less, 0.5% by weight or less, 0.45% by weight or less, 0.4% by weight or less, 0.35% by weight or less, 0.3% by weight or less, 0.25% by weight or less, 0.2% by weight or less, 0.15% by weight or less, 0.1% by weight or less, 0.09% by weight or less, 0.08% by weight or less, 0.07% by weight or less, 0.06% by weight or less, 0.05% by weight or less, 0.04% by weight or less, 0.03% by weight or less, or 0.02% by weight or less), based on the total weight of the aqueous pressure protection composition.

The total concentration of all surfactants in the aqueous pressure protection composition (the total concentration of the primary surfactant and the one or more secondary surfactants in the aqueous pressure protection composition) can range from any of the minimum values described above to any of the maximum values described above. For example, in some embodiments, the total concentration of all surfactants in the aqueous pressure protection composition (the total concentration of the primary surfactant and the one or more secondary surfactants in the aqueous pressure protection composition) can be from 0.01% by weight to 5% by weight (e.g., from 0.01% to 2.5% by weight, from 0.01% to 1% by weight, or from 0.01% to 0.5% by weight).

In some embodiments when the aqueous pressure protection composition is being injected into a horizontal well, the total concentration of all surfactants in the aqueous pressure protection composition (the total concentration of the primary surfactant and the one or more secondary surfactants in the aqueous pressure protection composition) can be from 0.01% to 1.5% by weight, from 0.01% to 1% by weight, or from 0.01% to 0.5% by weight.

In some embodiments when the aqueous pressure protection composition is being injected into a vertical well, the total concentration of all surfactants in the aqueous pressure protection composition (the total concentration of the primary surfactant and the one or more secondary surfactants in the aqueous pressure protection composition) can be from 0.01% to 5% by weight, from 0.01% to 1% by weight, from 0.5% to 5% by weight, from 0.5% to 2.5% by weight, from 0.5% to 1.5% by weight, from 0.5% to 1% by weight, from 1% to 5% by weight, from 1% to 2.5% by weight, or from 1% to 1.5% by weight.

In some embodiments, the aqueous pressure protection composition can comprise a non-ionic surfactant and an anionic surfactant (e.g., a sulfonate or disulfonate). In some embodiments, the aqueous pressure protection composition can comprise a non-ionic surfactant and two or more anionic surfactants (e.g., a sulfonate or disulfonate and a carboxylate). In some embodiments, the aqueous pressure protection composition can comprise a non-ionic surfactant (e.g., a C6-C16 alkyl phenol ethoxylate, or a C6-C16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol) and a sulfonate surfactant (e.g., a C10-16 disulfonate, or a C16-28 IOS). In some embodiments, the aqueous pressure protection composition can comprise a non-ionic surfactant (e.g., a C6-C16 alkyl phenol ethoxylate, or a C6-16:PO(0-25):EO(0-25), such as a C9-C11 ethoxylated alcohol, a C13 ethoxylated alcohol, a C6-C10 ethoxylated propoxylated alcohol, or a C10-C14 ethoxylated Guerbet alcohol), a sulfonate surfactant (e.g., a C10-16 disulfonate, or a C16-28 IOS), and a carboxylate surfactant (e.g., a C10-16 alkyl polyglucoside carboxylate or a C22-C36 Guerbet alkoxylated carboxylate).

Specific example embodiments include the aqueous pressure protection compositions in the table below (as well as aqueous pressure protection composition containing the surfactant packages shown in the table below).

| Example | Surfactants and Co-Surfactants in Surfactant Package (in weight percent) |
|---|---|
| 1 | 0.09% alkoxylated C6-C16 alcohol<br>0.06% disulfonate |
| 2 | 0.1% alkoxylated C6-C16 alcohol<br>0.1% carboxylate<br>0.1% disulfonate |
| 3 | 0.15% alkoxylated C6-C16 alcohol<br>0.075% carboxylate<br>0.075% disulfonate |
| 4 | 0.2% alkoxylated C6-C16 alcohol<br>0.1% carboxylate |
| 5 | 0.2% alkoxylated C6-C16 alcohol<br>0.033% carboxylate<br>0.066% disulfonate |
| 6 | 0.2% alkoxylated C6-C16 alcohol<br>0.033% carboxylate<br>0.066% disulfonate |
| 7 | 0.2% alkoxylated C6-C16 alcohol<br>0.05% carboxylate<br>0.05% olefin sulfonate |
| 8 | 0.15% alkoxylated C6-C16 alcohol<br>0.05% carboxylate<br>0.05% olefin sulfonate<br>0.05% alkyl polyglucoside |
| 9 | 0.1% alkoxylated C6-C16 alcohol<br>0.05% carboxylate<br>0.05% olefin sulfonate<br>0.1% alkyl polyglucoside |
| 10 | 0.15% alkoxylated C6-C16 alcohol<br>0.07% carboxylate<br>0.03% olefin sulfonate<br>0.1% alkyl polyglucoside |
| 11 | 0.1% alkoxylated C6-C16 alcohol<br>0.04% carboxylate<br>0.05% olefin sulfonate<br>0.03% disulfonate<br>0.1% alkyl polyglucoside |
| 12 | 0.1% alkoxylated C6-C16 alcohol<br>0.04% carboxylate<br>0.06% disulfonate<br>0.1% alkyl polyglucoside |
| 13 | 0.15% alkoxylated C6-C16 alcohol<br>0.15% alkoxylated alkylphenol<br>0.1% olefin sulfonate<br>0.1% Guerbet alkoxylated carboxylate |
| 14 | 0.125% alkoxylated C6-C16 alcohol<br>0.175% alkoxylated alkylphenol<br>0.1% olefin sulfonate<br>0.1% Guerbet alkoxylated carboxylate |
| 15 | 0.1% alkoxylated C6-C16 alcohol<br>0.2% alkoxylated alkylphenol<br>0.1% olefin sulfonate<br>0.1% Guerbet alkoxylated carboxylate |
| 16 | 0.12% alkoxylated C6-C16 alcohol<br>0.22% alkoxylated alkylphenol<br>0.08% olefin sulfonate<br>0.08% Guerbet alkoxylated carboxylate |
| 17 | 0.15% alkoxylated C6-C16 alcohol<br>0.15% alkoxylated alkylphenol<br>0.08% olefin sulfonate<br>0.06% Guerbet alkoxylated carboxylate<br>0.06% carboxylate |
| 18 | 0.15% alkoxylated C6-C16 alcohol<br>0.15% alkoxylated alkylphenol<br>0.05% olefin sulfonate<br>0.1% Guerbet alkoxylated carboxylate<br>0.05% disulfonate |
| 19 | 0.5% olefin sulfonate<br>0.5% Guerbet alkoxylated carboxylate<br>0.55% glycosides or glucosides |
| 20 | 0.5% olefin sulfonate<br>0.5% Guerbet alkoxylated carboxylate<br>0.5% glycosides or glucosides<br>0.25% alkoxylated C6-C16 alcohol |

| Example | Surfactants and Co-Surfactants in Surfactant Package (in weight percent) |
|---|---|
| 21 | 0.5% olefin sulfonate<br>0.5% Guerbet alkoxylated carboxylate<br>0.5% glycosides or glucosides<br>0.5% alkoxylated C6-C16 alcohol |
| 22 | 0.5% olefin sulfonate<br>0.5% Guerbet alkoxylated carboxylate<br>1% glycosides or glucosides<br>0.5% alkoxylated C6-C16 alcohol |
| 23 | 0.05% olefin sulfonate<br>0.05% Guerbet alkoxylated carboxylate<br>0.05% glycosides or glucosides<br>0.05% alkoxylated C6-C16 alcohol |
| 24 | 0.075% glycosides or glucosides<br>0.075% alkoxylated C6-C16 alcohol |
| 25 | 0.1% alkoxylated C6-C16 alcohol<br>0.05% disulfonate |
| 26 | 0.1% alkoxylated C6-C16 alcohol<br>0.05% disulfonate<br>0.03% hydroxyalkyl alkylammonium chloride |
| 27 | 0.03% olefin sulfonate<br>0.04% Guerbet alkoxylated carboxylate<br>0.08% glycosides or glucosides<br>0.05% alkoxylated C6-C16 alcohol |
| 28 | 0.4% olefin sulfonate<br>0.4% Guerbet alkoxylated carboxylate<br>0.7% glycosides or glucosides<br>0.5% alkoxylated C6-C16 alcohol |
| 29 | 0.05% olefin sulfonate<br>0.1% glycosides or glucosides<br>0.05% alkoxylated C6-C16 alcohol |
| 30 | 0.05% olefin sulfonate<br>0.1% alkyl polyglucoside<br>0.05% alkoxylated C6-C16 alcohol |
| 31 | 0.05% olefin sulfonate<br>0.1% glycosides or glucosides<br>0.05% alkoxylated C6-C16 alcohol |
| 32 | 0.05% olefin sulfonate<br>0.1% alkyl polyglucoside<br>0.05% alkoxylated C6-C16 alcohol |
| 33 | 0.05% olefin sulfonate<br>0.1% alkyl polyglucoside<br>0.05% alkoxylated C6-C16 alcohol |
| 34 | 0.05% olefin sulfonate<br>0.05% glycosides or glucosides<br>0.05% alkoxylated C6-C16 alcohol<br>0.05% carboxylate |
| 35 | 0.05% olefin sulfonate<br>0.05% glycosides or glucosides<br>0.05% alkoxylated C6-C16 alcohol<br>0.05% carboxylate |
| 36 | 0.05% olefin sulfonate<br>0.05% alkyl polyglucoside<br>0.05% alkoxylated C6-C16 alcohol |
| 37 | 0.06% olefin sulfonate<br>0.05% alkyl polyglucoside<br>0.04% alkoxylated C6-C16 alcohol |
| 38 | 0.04% olefin sulfonate<br>0.08% glycosides or glucosides<br>0.05% alkoxylated C6-C16 alcohol<br>0.03% disulfonate |
| 39 | 0.035% olefin sulfonate<br>0.075% glycosides or glucosides<br>0.05% alkoxylated C6-C16 alcohol<br>0.04% disulfonate |
| 40 | 0.035% olefin sulfonate<br>0.07% glycosides or glucosides<br>0.045% alkoxylated C6-C16 alcohol<br>0.05% disulfonate |
| 41 | 0.1% alkoxylated C6-C16 alcohol<br>0.1% disulfonate |
| 42 | 0.25% Guerbet alkoxylated carboxylate<br>0.25% olefin sulfonate<br>0.5% glycosides or glucosides<br>0.5% co-solvent |
| 43 | 0.075% alkoxylated C12-C22 alcohol<br>0.075% disulfonate |
| 44 | 0.075% alkoxylated C6-C16 Guerbet alcohol<br>0.075% disulfonate |
| 45 | 0.075% alkoxylated C12-C22 Guerbet alcohol<br>0.075% disulfonate |
| 46 | 0.075% alkoxylated C6-C16 alcohol<br>0.075% disulfonate |
| 47 | 0.075% disulfonate<br>0.075% alkoxylated C6-C16 alcohol |
| 48 | 0.0625% disulfonate<br>0.0875% alkoxylated C6-C16 alcohol |
| 49 | 0.055% disulfonate<br>0.095% alkoxylated C6-C16 alcohol |
| 50 | 0.075% disulfonate<br>0.075% alkoxylated C6-C16 alcohol |
| 51 | 1% alkoxylated C6-C16 alcohol<br>0.5% disulfonate |
| 52 | 1% alkoxylated C6-C16 alcohol |
| 53 | 1% alkoxylated C6-C16 alcohol<br>2.25% sulfosuccinate |
| 54 | 0.25% Guerbet alkoxylated carboxylate<br>1% alkoxylated C6-C16 alcohol<br>2.25% sulfosuccinate |
| 55 | 0.25% Guerbet alkoxylated carboxylate<br>1% alkoxylated alkylphenol<br>2.25% sulfosuccinate |
| 56 | 0.25% Guerbet alkoxylated carboxylate<br>1% alkoxylated C6-C16 alcohol |
| 57 | 0.25 Guerbet alkoxylated carboxylate<br>1% alkoxylated alkylphenol |
| 58 | 0.65% carboxylate<br>0.35% alkoxylated C6-C16 alcohol |
| 59 | 0.325% carboxylate<br>0.925% alkoxylated C6-C16 alcohol |
| 60 | 0.25% olefin sulfonate<br>1.0% alkoxylated C6-C16 alcohol |
| 61 | 0.15% olefin sulfonate<br>0.2% Guerbet alkoxylated carboxylate<br>0.92% carboxylate |
| 62 | 0.65% carboxylate<br>0.35% second carboxylate |
| 63 | 0.65% carboxylate<br>0.35% alkoxylated C6-C16 alcohol<br>1% olefin sulfonate |
| 64 | 1% alkoxylated alcohol<br>1% olefin sulfonate |
| 65 | 0.5% alkoxylated alcohol<br>0.5% olefin sulfonate<br>0.25% carboxylate |
| 66 | 0.6% co-solvent<br>0.6% olefin sulfonate |
| 67 | 0.6% co-solvent<br>0.3% disulfonate<br>0.3% olefin sulfonate |
| 68 | 0.6% Guerbet alkoxylated carboxylate<br>0.6% disulfonate |
| 69 | 0.6% co-solvent<br>0.4% disulfonate<br>0.2% olefin sulfonate |
| 70 | 0.5% alkoxylated C6-C16 alcohol<br>0.4% disulfonate<br>0.3% olefin sulfonate |
| 71 | 1% alkoxylated C6-C16 alcohol |
| 72 | 0.9% alkoxylated C6-C16 alcohol<br>0.6% disulfonate |
| 73 | 0.4% alkoxylated C6-C16 alcohol<br>0.35% disulfonate<br>0.25% olefin sulfonate<br>0.5% co-solvent |
| 74 | 0.25% Guerbet alkoxylated carboxylate<br>0.5% alkoxylated C6-C16 alcohol<br>0.35% disulfonate<br>0.15% olefin sulfonate<br>0.35% co-solvent |

| Example | Surfactants and Co-Surfactants in Surfactant Package (in weight percent) |
|---|---|
| 75 | 0.25% Guerbet alkoxylated carboxylate<br>0.25% alkoxylated C6-C16 alcohol<br>0.25% olefin sulfonate<br>0.25% co-solvent |
| 76 | 0.25% Guerbet alkoxylated carboxylate<br>0.25% alkoxylated C6-C16 alcohol<br>0.25% olefin sulfonate<br>0.25% alkoxylated alcohol |
| 77 | 0.25% Guerbet alkoxylated carboxylate<br>0.35% olefin sulfonate<br>0.5% alkoxylated alcohol |
| 78 | 0.25% Guerbet alkoxylated carboxylate<br>0.25% alkoxylated C6-C16 alcohol<br>0.15% olefin sulfonate<br>0.1% disulfonate<br>0.25% co-solvent |
| 79 | 0.25% Guerbet alkoxylated carboxylate<br>0.25% alkoxylated C6-C16 alcohol<br>0.25% olefin sulfonate<br>0.25% glycosides or glucosides<br>0.25% co-solvent<br>0.15% disulfonate |
| 80 | 0.25% Guerbet alkoxylated carboxylate<br>0.25% olefin sulfonate<br>0.5% glycosides or glucosides<br>0.25% co-solvent |
| 81 | 0.15% alkoxylated C12-C22 alcohol |
| 82 | 0.075% disulfonate<br>0.075% alkoxylated C12-C22 alcohol |
| 83 | 0.75% alkoxylated C12-C22 alcohol<br>0.75% disulfonate |
| 84 | 0.075% alkoxylated C12-C22 alcohol<br>0.075% alkoxylated C6-C16 Guerbet alcohol |
| 85 | 0.15% alkoxylated C6-C16 Guerbet alcohol |
| 86 | 0.075% disulfonate<br>0.075% alkoxylated C6-C16 Guerbet alcohol |
| 87 | 0.075% alkoxylated C6-C16 Guerbet alcohol<br>0.075% disulfonate<br>0.05% co-solvent |
| 88 | 0.1% alkoxylated C6-C16 alcohol<br>0.05% disulfonate |
| 89 | 1% alkoxylated C6-C16 alcohol<br>0.5% disulfonate |
| 90 | 0.075% alkoxylated C6-C16 Guerbet alcohol<br>0.075% disulfonate |
| 91 | 0.075% alkoxylated C6-C16 Guerbet alcohol<br>0.125% disulfonate |
| 92 | 0.075% alkoxylated C12-C22 alcohol<br>0.125% disulfonate |
| 93 | 0.75% disulfonate<br>0.75% alkoxylated C12-C22 alcohol |
| 94 | 0.75% alkoxylated C6-C16 Guerbet alcohol<br>0.75% disulfonate |
| 95 | 0.1% alkoxylated C6-C16 Guerbet alcohol<br>0.05% disulfonate |
| 96 | 0.75% disulfonate<br>0.75% alkoxylated C6-C16 Guerbet alcohol |
| 97 | 0.75% alkoxylated C6-C16 alcohol<br>0.75% disulfonate |
| 98 | 0.75% disulfonate<br>0.75% alkoxylated C6-C16 alcohol |
| 99 | 0.1% alkoxylated C6-C16 alcohol<br>0.05% disulfonate |
| 100 | 0.09% alkoxylated C6-C16 alcohol<br>0.06% disulfonate |
| 101 | 0.1% alkoxylated C6-C16 alcohol<br>0.1% disulfonate<br>0.1% Guerbet alkoxylated carboxylate |
| 102 | 0.1% alkoxylated C6-C16 alcohol<br>0.1% disulfonate |
| 103 | 0.65% Guerbet alkoxylated carboxylate<br>0.35% olefin sulfonate<br>0.33% alkoxylated alkylphenol<br>0.5% co-solvent<br>0.25% second co-solvent |
| 104 | 0.075% alkoxylated C6-C16 alcohol<br>0.075% benzenesulfonic acid, decyl(sulfophenoxy)-disodium salt |
| 105 | 0.15% alkoxylated C6-C16 alcohol<br>0.05% benzenesulfonic acid, decyl(sulfophenoxy)-disodium salt |
| 106 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% acetic acid |
| 107 | 1% alkoxylated C6-C16 alcohol<br>1% olefin sulfonate<br>2% sodium tetraborate<br>1% acetic acid |
| 108 | 1% alkoxylated C6-C16 alcohol<br>0.75% olefin sulfonate<br>0.5% disulfonate<br>2% sodium tetraborate<br>1% acetic acid |
| 109 | 1% alkoxylated C6-C16 alcohol<br>0.75% olefin sulfonate<br>0.3% disulfonate<br>2% sodium tetraborate<br>1% acetic acid |
| 110 | 0.5% alkoxylated C6-C16 alcohol<br>0.85% olefin sulfonate<br>0.15% disulfonate<br>2% sodium tetraborate<br>1% acetic acid |
| 111 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1% citric acid |
| 112 | 1% alkoxylated C6-C16 alcohol<br>0.75% olefin sulfonate<br>0.3% disulfonate<br>2% sodium tetraborate<br>1% citric acid |
| 113 | 0.9% Guerbet alkoxylated carboxylate<br>0.9% alkoxylated C6-C16 alcohol<br>1.2% olefin sulfonate<br>0.225% co-solvent<br>2% sodium tetraborate<br>1.1% citric acid |
| 114 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>2% sodium tetraborate<br>1% acetic acid |
| 115 | 0.5% C6-C16 alcohol alkoxylated carboxylate<br>0.25% alkoxylated C6-C16 alcohol<br>0.15% olefin sulfonate<br>0.35% disulfonate<br>2% sodium tetraborate<br>1% acetic acid |
| 116 | 0.5% Guerbet alkoxylated carboxylate<br>0.25% C6-C16 alcohol alkoxylated carboxylate<br>0.5% alkoxylated C6-C16 alcohol<br>0.5% olefin sulfonate<br>0.1% disulfonate<br>0.5% co-solvent<br>0.02% cetyl betaine<br>2% sodium tetraborate<br>1% acetic acid |

In some embodiments, the one or more surfactants in the aqueous pressure protection composition can decrease the interfacial tension (IFT) of the aqueous pressure protection composition with hydrocarbons in the reservoir. Reducing the IFT can decrease pressure required to drive the aqueous pressure protection composition into the formation matrix. In addition, decreasing the IFT reduces water block during production, facilitating the flow of hydrocarbons from the formation to the wellbore (e.g., facilitating the flow of hydrocarbons back through the fractures and to the wellbore). In this way, hydrocarbon recovery can be facilitated by the one or more surfactants in the aqueous pressure protection composition.

In some embodiments, the one or more surfactants in the aqueous pressure protection composition can change the wettability of the reservoir. In particular, in embodiments where the reservoir is oil-wet or mixed-wet, the one or more surfactants in the aqueous pressure protection composition can make the reservoir more water-wet. By increasing the water-wetness of the reservoir, the formation will imbibe injected aqueous pressure protection composition into the formation matrix, leading to a corresponding flow of hydrocarbon from regions within the formation back to the fractures. In this way, hydrocarbon recovery can be facilitated by the one or more surfactants in the aqueous pressure protection composition.

Nanoparticles

In some embodiments, the aqueous pressure protection compositions can comprise nanoparticles. The nanoparticles can comprise any of the component of the aqueous pressure protection compositions described herein. For example, the nanoparticles can comprise surfactant package (or one or more components thereof, an acid, an alkali agent, a co-solvent, a viscosity-modifying polymer, or any combination thereof). The nanoparticles can also comprise additional additives suitable for incorporation in the aqueous pressure protection compositions, such as a chelating agent (e.g., EDTA or a salt thereof, to reduce formation damage), a clay swelling inhibitor (e.g., KCl, to improve injection efficiency), a biocide, a scale inhibitor, an anti-foam agent (e.g., chemical defoamer), a corrosion inhibitor, or any combination thereof. Other examples of suitable nanoparticles are described, for example, in U.S. Pat. No. 10,266,750, which is hereby incorporated by reference in its entirety.

Foamed Pressure Protection Compositions

Also provided are analogous pressure protection methods which employ foamed pressure protection compositions. For example, in some embodiments, a foam can be injected into the existing wellbore to provide pressure protection to the existing wellbore prior to fracturing a new wellbore proximate to the existing wellbore. The foam can comprise any suitable foam known for use in oil and gas operations. The foam can be formed using any suitable expansion gas as discussed in detail below, such as, for example, air, helium, carbon dioxide, nitrogen, natural gas or a hydrocarbon component thereof, or any combination thereof.

Accordingly, also provided are methods for pressure protection of an existing wellbore that has previously been fractured in proximity to a new wellbore to be fractured that comprise (a) injecting a foamed pressure protection composition into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the foamed pressure protection solution can be injected at a pressure and flowrate effective to increase the existing wellbore pressure without substantially refracturing the existing wellbore.

All of these methods can be analogously performed using foamed compositions.

The foam can be produced on the surface (above ground) or downhole (e.g., bottom hole using methods known in the art for artificial lift operations). Accordingly, in some embodiments, step (a) can comprise combining a foam precursor solution with an expansion gas to form the foamed pressure protection composition above ground, and injecting the foamed pressure protection composition into the existing wellbore. In other embodiments, step (a) can comprise combining a foam precursor solution with an expansion gas downhole to form the foamed pressure protection composition in situ within the existing wellbore.

In some embodiments, the foamed pressure protection composition can have a viscosity of at least 1.5 cP at 25° C., such as a viscosity of at least 5 cP at 25° C. In some embodiments, the the foamed pressure protection composition can have a viscosity of from 1.5 cP to 50,000 cP at 25° C., such as a viscosity of from 5 cP to 50,000 cP at 25° C.

The foamed pressure protection composition can comprise a surfactant package comprising a primary foaming surfactant. The primary foaming surfactant can comprise, for example, an anionic surfactant, a zwitterionic surfactant, an amphoteric surfactant, a cationic surfactant, or a non-ionic surfactant. In certain embodiments, the primary foaming surfactant can comprise an anionic surfactant, a zwitterionic surfactant, or an amphoteric surfactant. Optionally, the surfactant package can further comprise one or more secondary surfactants. The one or more secondary surfactants comprise one or more anionic surfactants, one or more cationic surfactants, one or more non-ionic surfactants, one or more zwitterionic surfactants, one or more amphoterics, one or more fluorinated surfactants, or any combination thereof. Examples of suitable surfactants (and combinations of surfactants) are described above with respect to the surfactant packages that can be incorporated in the aqueous pressure protection compositions described herein.

In some embodiments, the foamed pressure protection composition can comprise from 30% to 98% expansion gas, such as from 50% to 98% expansion gas. The expansion gas can comprise, for example, air, helium, carbon dioxide, nitrogen, natural gas or a hydrocarbon component thereof, or any combination thereof.

In certain embodiments, the foamed pressure protection compositions can be substantially free of proppant particles.

Optionally, the foamed pressure protection compositions can comprise a viscosity-modifying polymer. Examples of viscosity-modifying polymers are known in the art. Examples of suitable polymers include biopolymers such as polysaccharides. For example, polysaccharides can be xanthan gum, guar gum, a scleroglucan, a schizophyllan, HEC, a mixture thereof (e.g., any modifications thereof such as a modified chain), etc. Indeed, the terminology "mixtures thereof" or "combinations thereof" can include "modifications thereof" herein. Examples of suitable synthetic polymers include polyacrylamides. Examples of suitable polymers include synthetic polymers such as partially hydrolyzed polyacrylamides (HPAMs or PHPAs) and hydrophobically-modified associative polymers (APs). Also included are co-polymers of polyacrylamide (PAM) and one or both of 2-acrylamido 2-methylpropane sulfonic acid (and/or sodium salt) commonly referred to as AMPS (also more generally known as acrylamido tertiobutyl sulfonic acid or ATBS), N-vinyl pyrrolidone (NVP), and the NVP-based synthetic may be single-, co-, or ter-polymers. In one embodiment, the synthetic polymer is polyacrylic acid (PAA). In one embodiment, the synthetic polymer is polyvinyl alcohol (PVA). Copolymers may be made of any combination or mixture above, for example, a combination of NVP and ATBS.

In some embodiments, the foamed pressure protection composition can comprise a foam stabilizer. Examples of foam stabilizers include crosslinkers (e.g., a borate crosslinking agent, a Zr crosslinking agent, a Ti crosslinking agent, an Al crosslinking agent, an organic crosslinker, or any combination thereof), particulate stabilizers (e.g., nanoparticles or microparticles comprising, for example, nickel oxide, alumina, silica (surface-modified), a silicate, iron oxide ($Fe_3O_4$), titanium oxide, impregnated nickel on alumina, synthetic clay, natural clay, iron zinc sulfide, magnetite, iron octanoate, or any combination thereof), or combinations thereof.

Foamed pressure protection compositions can further include any of the components described above with respect to aqueous pressure protection compositions. For example, foamed pressure protection compositions can also include an acid, an alkali agent, a co-solvent, or any combination thereof. (e.g., such as those described hereinabove). Additional additives can also be incorporated in the foamed pressure protection compositions, such as a chelating agent (e.g., EDTA or a salt thereof, to reduce formation damage), a clay swelling inhibitor (e.g., KCl, to improve injection efficiency), a biocide, a scale inhibitor, an anti-foam agent (e.g., chemical defoamer), a corrosion inhibitor, or any combination thereof.

Non-Aqueous Pressure Protection Compositions

Also provided are analogous pressure protection methods which employ non-aqueous pressure protection compositions. Such compositions can reduce the need for water in pressure protection operations. For example, in some embodiments, a gas can be injected into the existing wellbore to provide pressure protection to the existing wellbore prior to and/or during fracturing a new wellbore proximate to the existing wellbore. The gas can comprise any suitable gas, such as, for example, air, helium, carbon dioxide, nitrogen, natural gas or a hydrocarbon component thereof, or any combination thereof.

Example methods can comprise (a) injecting a gas into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the gas can be injected at a pressure and flowrate effective to increase the existing wellbore pressure without substantially refracturing the existing wellbore.

Other methods can employ suitable hydrocarbon-based pressure protection composition. For example, pressure protection compositions comprising a hydrocarbon solvent (e.g., liquid petroleum gas (LPG), hexanes, xylenes, etc.) can be injected into the existing wellbore to provide pressure protection to the existing wellbore prior to and/or during fracturing a new wellbore proximate to the existing wellbore. These hydrocarbon-based pressure protection compositions can comprise any of the components described above with respect to aqueous pressure protection compositions. For example, hydrocarbon-based pressure protection compositions can comprise a surfactant package, an acid, an alkali agent, a co-solvent, a viscosity-modifying polymer, or any combination thereof. Additional additives can also be incorporated in the hydrocarbon-based pressure protection compositions, such as a chelating agent (e.g., EDTA or a salt thereof, to reduce formation damage), a clay swelling inhibitor (e.g., KCl, to improve injection efficiency), a biocide, a scale inhibitor, an anti-foam agent (e.g., chemical defoamer), a corrosion inhibitor, or any combination thereof.

Example methods can comprise (a) injecting a pressure protection composition comprising a hydrocarbon solvent into the unconventional subterranean formation via an existing wellbore in fluid communication with a rock matrix of the unconventional subterranean formation prior to and/or during injection of a fracturing fluid into the unconventional subterranean formation via a new wellbore in fluid communication with the rock matrix of the unconventional subterranean formation; and (b) producing a hydrocarbon from the existing wellbore during and/or after the injection of the fracturing fluid into the unconventional subterranean formation via the new wellbore. The rock matrix of the unconventional subterranean formation in proximity to the existing wellbore can be fractured. As discussed above with respect to aqueous pressure protection compositions, the pressure protection composition can be injected at a pressure and flowrate effective to increase the existing wellbore pressure without substantially refracturing the existing wellbore.

By way of non-limiting illustration, examples of certain embodiments of the present disclosure are given below.

EXAMPLES

Example 1

Computational Evaluation of Pressure Protection

As shown in FIG. 1A, simulations were performed to demonstrate the beneficial effect of pre-loading an existing (parent) well with an aqueous composition prior to fracturing a nearby new (child) well. The results demonstrate that an aqueous pre-load improves new (child) well fracture propagation towards virgin rock as opposed to towards the previously fractured rock matrix in proximity to the existing well.

FIG. 1B is a plot illustrating the projected improvement in oil recovery as a result of pre-loading with an aqueous pressure protection composition. Pre-loading results in a 6% EUR uplift in child well production as a consequence of pre-loading.

Example 2

Pre-Loading with Surfactant Solutions

Pilot 1—Materials and Methods: The sample surfactant formulation used included 0.1% alkoxylated C6-C16 alcohol and 0.1% disulfonate. Two wells were pre-loaded—one with an aqueous surfactant formulation and the other with water. The water pre-loaded well was used as a control for comparison. Four wells were not pre-loaded for flow during the frac. In this pilot, the non pre-loaded wells were slightly affected by frac interaction. The well depletion level was not significant. Wells were producing about 30% EUR (estimated ultimate recovery) before the offset frac.

The pre-loaded wells were shut-in for 24 hours before pre-loading. 20,000 bbls of water loaded with 0.2% surfactant concentration were injected and the surfactant pre-loaded well was shut-in for 41 days after the pre-loading during the offset frac. The water pre-loaded well was loaded with 20,000 bbls of water and shut-in for 54 days after the pre-loading during the offset frac. The loading conditions are detailed in Table 1.

TABLE 1

Pilot 1 loading conditions.

| | Expected water volume (bbls) | Surfactant Feed Rate (gpt) | Surfactant (lbs./M. ton/gal) | # of 21 KL ISOs | Target Surfactant concentration (%) | Job time |
|---|---|---|---|---|---|---|
| Well | 20,000 | 3.80 | 28.59/12.97/3,191 | 0.64 | 0.2 | ~84 hrs. (~3.5 days) @ 4 bbl./min |

The normalized rate was calculated after the frac and plotted versus the time (days) after the frac. The normalized rate was calculated using the following formula: Normalized rate=[Actual oil flow rate−Decline curve analysis predicted rate]/Decline curve analysis predicted rate.

A negative normalization rate means well is underperforming, a positive normalization rate means well is performing above expectations, and a normalization rate of zero means the well is producing as expected.

Pilot 1—Results: The results for Pilot 1 are shown in FIG. 2. This initial study suggests that certain parameters such as soaking time ahead of offset frac and surfactant concentrations will be optimized in future pilots. Frac water reaching the pre-loaded wells might be diluting the surfactant concentration before the surfactant imbibe in the reservoir rock, since this initial result showed that water pre-loading has a better performance compared to the surfactant formulation pre-loading well and the non-preloaded wells.

Pilot 2—Materials and methods: The sample surfactant formulation used includes 0.1% alkoxylated C6-C16 alcohol and 0.1% disulfonate.

Two wells were pre-loaded with surfactant formulation. Seven wells were not pre-loaded for flow during the frac. In this pilot the non pre-loaded wells were negatively affected by frac interaction. The well depletion level was significant. Wells were producing about 50% EUR (estimated ultimate recovery) before the offset frac.

The pre-loaded wells were shut-in for 24 hours before pre-loading. 20,000 bbls of water loaded with 0.2% surfactant concentration were inject and the surfactant pre-loaded well was shut-in for 36 days after the pre-loading during the offset frac. The loading conditions are detailed in Table 2.

TABLE 2

Pilot 2 loading conditions.

| | Expected water volume (bbls) | Surfactant Feed Rate (gpt) | Surfactant (lbs./M. ton/gal) | # of 21 KL ISOs | Target Surfactant concentration (%) | Job time |
|---|---|---|---|---|---|---|
| Well | 20,000 | 3.80 | 28.59/12.79/1,191 | 0.64 | 0.2 | ~84 hrs. (~3.5 days) @ 4 bbl./min |

The normalized rate was calculated after the frac and plotted versus the time (days) after the frac. The normalized rate was calculated using the following formula: Normalized rate=[Actual oil flow rate−Decline curve analysis predicted rate]/Decline curve analysis predicted rate.

Figure 3:
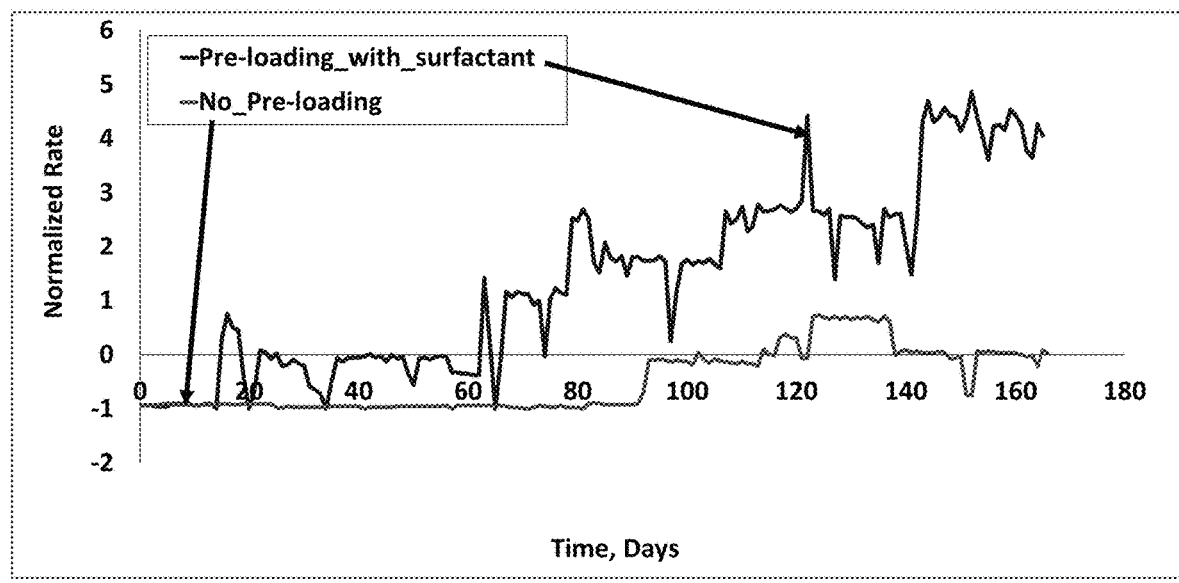
FIG. 3 is a plot illustrating the results of pilot 2. The plot illustrates the normalized rate of hydrocarbon production post frac versus post frac time for wells treated with surfactant pre-loading and water pre-loading.

Pilot 2—Results: The results for Pilot 2 are shown in FIG. 3. One of the surfactant pre-loaded wells showed promising results. According to FIG. 3, surfactant pre-loaded well exhibited significantly better performance compared to non-preloading well. One surfactant pre-loaded well was not conclusive because the well casing was damaged during the frac interaction and was down for 4 months.

The methods of the appended claims are not limited in scope by the specific methods described herein, which are intended as illustrations of a few aspects of the claims. Any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method for pressure protection of an existing wellbore that has previously been fractured in proximity to a new wellbore to be fractured, the method comprising:
    injecting a foamed pressure protection composition into the existing wellbore in fluid communication with an unconventional subterranean formation prior to, during, or prior to and during fracturing of the new wellbore in fluid communication with the unconventional subterranean formation;
    wherein the existing wellbore has an existing reservoir pressure that is less than original reservoir pressure;
    wherein the foamed pressure protection composition is injected at a pressure and flowrate effective to increase the existing wellbore pressure without refracturing the existing wellbore;
    wherein the foamed pressure protection composition in the existing wellbore biases fracture formation away from the previously fractured rock matrix in proximity to the existing wellbore and towards virgin rock proximate to the new wellbore; and wherein the foamed pressure protection composition comprises an alkoxylated C6-C16 alcohol and a disulfonate.

2. The method of claim 1, wherein the existing wellbore was under production for at least three months prior to injection of the foamed pressure protection composition.

3. The method of claim 1, wherein the existing wellbore pressure is from 20% to 70% of the original reservoir pressure.

4. The method of claim 1, wherein injecting the foamed pressure protection composition comprises injecting the foamed pressure protection composition at a pressure and flowrate effective to increase the existing wellbore pressure by at least 30%, to increase the existing wellbore pressure to from greater than the original reservoir pressure to 150% of the original reservoir pressure, to increase the existing wellbore pressure to within 15% of original reservoir fracture pressure, or any combination thereof.

5. The method of claim 1, wherein the foamed pressure protection composition is injected at least 1 day before fracturing.

6. The method of claim 1, wherein the method further comprises injecting a fracturing fluid into the unconventional subterranean formation via the new wellbore at a sufficient pressure to create or extend at least one fracture in a rock matrix of the unconventional subterranean formation in a region proximate to the new wellbore.

7. The method of claim 6, wherein the method further comprises producing a hydrocarbon from the existing wellbore during, after, or during and after the injection of the fracturing fluid into the unconventional subterranean formation via the new wellbore.

8. The method of claim 6, wherein the injection of the foamed pressure protection composition in the existing wellbore impacts a direction, a geometry, or any combination thereof of the at least one fracture created or extended in the rock matrix during injection of the fracturing fluid into the unconventional subterranean formation via the new wellbore.

9. The method of claim 1, wherein injection of the foamed pressure protection composition in the existing wellbore increases a relative permeability in a region proximate to the existing wellbore.

10. The method of claim 1, wherein the method further results in increased hydrocarbon recovery from the existing wellbore, the new wellbore, or any combination thereof.

11. The method of claim 1, wherein injecting a foamed pressure protection composition into the existing wellbore comprises combining a foam precursor solution with an expansion gas to form the foamed pressure protection composition above ground, and injecting the foamed pressure protection composition into the existing wellbore.

12. The method of claim 1, wherein injecting a foamed pressure protection composition into the existing wellbore comprises combining a foam precursor solution with an expansion gas downhole to form the foamed pressure protection composition in situ within the existing wellbore.

13. The method of claim 12, wherein combining the foam precursor solution with the expansion gas downhole comprises coinjection of the foam precursor solution and the expansion gas.

14. The method of claim 12, wherein combining the foam precursor solution with the expansion gas downhole comprises alternating injection of the foam precursor solution and the expansion gas.

15. The method of claim 1, wherein the foamed pressure protection composition has a viscosity of at least 1.5 cP at 25° C.

16. The method of claim 1, wherein the foamed pressure protection composition comprises a surfactant package comprising a primary foaming surfactant, optionally wherein the primary foaming surfactant comprises an anionic surfactant, a zwitterionic surfactant, an amphoteric surfactant, a cationic surfactant, or a non-ionic surfactant.

17. The method of claim 16, wherein the surfactant package further comprises one or more secondary surfactants.

18. The method of claim 1, wherein the foamed pressure protection composition comprises from 30% to 98% expansion gas.

19. The method of claim 1, wherein injection of the foamed pressure protection composition into the existing wellbore comprises:
injecting a first foamed pressure protection composition into the existing wellbore, then injecting a second foamed pressure protection composition into the existing wellbore;
injecting a foamed pressure protection composition into the existing wellbore, then injecting a gas into the existing wellbore;
injecting a foamed pressure protection composition into the existing wellbore, then injecting a hydrocarbon solvent into the existing wellbore; or
any combination thereof.

20. A method for pressure protection of a first wellbore in proximity to a second wellbore, the method comprising:
injecting a foamed pressure protection composition into the first wellbore in fluid communication with an unconventional subterranean formation prior to, during, or prior to and during fracturing of the second wellbore in fluid communication with the unconventional subterranean formation;
wherein the first wellbore has an existing reservoir pressure that is less than original reservoir pressure;
wherein a rock matrix of the unconventional subterranean formation in proximity to the first wellbore is previously fractured;
wherein the foamed pressure protection solution is injected at a pressure and flowrate effective to increase the first wellbore pressure without fracturing the first wellbore;
wherein the foamed pressure protection composition in the first wellbore biases fracture formation away from the previously fractured rock matrix in proximity to the first wellbore and towards virgin rock proximate to the second wellbore; and
wherein the foamed pressure protection composition comprises an alkoxylated C6-C16 alcohol and a disulfonate.

* * * * *